US009609006B2

(12) United States Patent
Call et al.

(10) Patent No.: US 9,609,006 B2
(45) Date of Patent: *Mar. 28, 2017

(54) DETECTING THE INTRODUCTION OF ALIEN CONTENT

(71) Applicant: Shape Security, Inc., Palo Alto, CA (US)

(72) Inventors: Justin D. Call, Santa Clara, CA (US); Subramanian Varadarajan, San Jose, CA (US); Xiaochan Huang, Cupertino, CA (US); Xiaoming Zhou, Sunnyvale, CA (US); Marc R. Hansen, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/980,409

(22) Filed: Dec. 28, 2015

(65) Prior Publication Data

US 2016/0149939 A1 May 26, 2016

Related U.S. Application Data

(63) Continuation of application No. 14/055,576, filed on Oct. 16, 2013, now Pat. No. 9,225,737.

(Continued)

(51) Int. Cl.
*H04L 29/06* (2006.01)
*G06F 21/12* (2013.01)
(Continued)

(52) U.S. Cl.
CPC ........ *H04L 63/1416* (2013.01); *G06F 21/128* (2013.01); *G06F 21/54* (2013.01);
(Continued)

(58) Field of Classification Search
USPC .......................................................... 726/23
See application file for complete search history.

(56) References Cited

U.S. PATENT DOCUMENTS

| 5,509,076 A | 4/1996 | Sprunk |
|---|---|---|
| 6,938,170 B1 | 8/2005 | Kraft et al. |

(Continued)

FOREIGN PATENT DOCUMENTS

| CN | 101471818 | 5/2011 |
|---|---|---|
| GB | 2443093 | 4/2008 |

(Continued)

OTHER PUBLICATIONS

"Design and implementation of a distributed virtual machine for networked computers"; Sirer et al; ACM SIGOPS Operating Systems, 1999, p. 202-216; 15 pages.*

(Continued)

*Primary Examiner* — Jason Lee
(74) *Attorney, Agent, or Firm* — J. Johnson

(57) ABSTRACT

A computer-implemented method for identifying abnormal computer behavior includes receiving, at a computer server subsystem, data that characterizes subsets of particular document object models for web pages rendered by particular client computers; identifying clusters from the data that characterize the subsets of the particular document object models; and using the clusters to identify alien content on the particular client computers, wherein the alien content comprises content in the document object models that is not the result of content that is the basis of the document object model served.

20 Claims, 5 Drawing Sheets

Related U.S. Application Data

(60) Provisional application No. 61/801,375, filed on Mar. 15, 2013.

(51) Int. Cl.
  *G06F 21/54* (2013.01)
  *G06F 21/55* (2013.01)
  *H04L 29/08* (2006.01)

(52) U.S. Cl.
  CPC ........ *G06F 21/552* (2013.01); *H04L 63/1425* (2013.01); *H04L 63/1466* (2013.01); *H04L 63/1483* (2013.01); *H04L 67/02* (2013.01)

(56) References Cited

U.S. PATENT DOCUMENTS

| | | | |
|---|---|---|---|
| 7,058,699 | B1 | 6/2006 | Chiou et al. |
| 7,117,429 | B2 | 10/2006 | Vedullapalli et al. |
| 7,464,326 | B2 | 12/2008 | Kawai et al. |
| 7,475,341 | B2 | 1/2009 | Malik |
| 7,480,385 | B2 | 1/2009 | Weber |
| 7,500,099 | B1 | 3/2009 | McElwee et al. |
| 7,707,223 | B2 | 4/2010 | Zubenko et al. |
| 7,836,425 | B2 | 11/2010 | Rubin et al. |
| 7,895,653 | B2 | 2/2011 | Calo et al. |
| 8,020,193 | B2 | 9/2011 | Bhola et al. |
| 8,086,756 | B2 | 12/2011 | Kamyshenko et al. |
| 8,086,957 | B2 | 12/2011 | Bauchot et al. |
| 8,170,020 | B2 | 5/2012 | Oliver et al. |
| 8,200,958 | B2 | 6/2012 | Coppola et al. |
| 8,225,401 | B2 | 7/2012 | Sobel et al. |
| 8,266,202 | B1 | 9/2012 | Colton et al. |
| 8,266,243 | B1 | 9/2012 | Carlson et al. |
| 8,332,952 | B2 | 12/2012 | Zhang et al. |
| 8,347,396 | B2 | 1/2013 | Grigsby et al. |
| 8,453,126 | B1 | 5/2013 | Ganelin |
| 8,533,480 | B2 | 9/2013 | Pravetz et al. |
| 8,555,388 | B1 | 10/2013 | Wang et al. |
| 8,561,193 | B1 | 10/2013 | Srivastava et al. |
| 8,589,405 | B1 | 11/2013 | Estan |
| 8,621,197 | B2 | 12/2013 | Suryanarayana et al. |
| 8,677,481 | B1 | 3/2014 | Lee |
| 8,689,330 | B2 | 4/2014 | Sinn et al. |
| 8,762,962 | B2 | 6/2014 | Ben-Artzi et al. |
| 2002/0199116 | A1 | 12/2002 | Hoene et al. |
| 2003/0005129 | A1 | 1/2003 | Scheinkman |
| 2004/0088651 | A1 | 5/2004 | McKnight et al. |
| 2004/0162994 | A1 | 8/2004 | Cohen |
| 2005/0216770 | A1 | 9/2005 | Rowett et al. |
| 2005/0240999 | A1 | 10/2005 | Rubin et al. |
| 2005/0251536 | A1 | 11/2005 | Harik |
| 2005/0278626 | A1 | 12/2005 | Malik |
| 2006/0053295 | A1 | 3/2006 | Madhusudan et al. |
| 2006/0288418 | A1 | 12/2006 | Yang et al. |
| 2007/0011295 | A1 | 1/2007 | Hansen |
| 2007/0064617 | A1 | 3/2007 | Reves |
| 2007/0074227 | A1 | 3/2007 | Naidu et al. |
| 2007/0241174 | A1 | 10/2007 | Turvery et al. |
| 2008/0222736 | A1 | 9/2008 | Boodaei et al. |
| 2009/0070459 | A1 | 3/2009 | Cho et al. |
| 2009/0099988 | A1 | 4/2009 | Stokes et al. |
| 2009/0193513 | A1 | 7/2009 | Agarwal et al. |
| 2009/0216882 | A1 | 8/2009 | Britton et al. |
| 2009/0241174 | A1 | 9/2009 | Rajan et al. |
| 2009/0249310 | A1 | 10/2009 | Meijer et al. |
| 2009/0282062 | A1 | 11/2009 | Husic |
| 2009/0292791 | A1 | 11/2009 | Livshits |
| 2009/0292984 | A1 | 11/2009 | Bauchot et al. |
| 2010/0100927 | A1 | 4/2010 | Bhola et al. |
| 2010/0186089 | A1 | 7/2010 | Fu et al. |
| 2010/0235637 | A1 | 9/2010 | Lu et al. |
| 2010/0235910 | A1 | 9/2010 | Ku et al. |
| 2010/0257354 | A1 | 10/2010 | Johnston et al. |
| 2010/0262780 | A1 | 10/2010 | Mahan et al. |
| 2010/0287132 | A1 | 11/2010 | Hauser |
| 2011/0015917 | A1 | 1/2011 | Wang et al. |
| 2011/0022846 | A1 | 1/2011 | Ginter et al. |
| 2011/0047169 | A1 | 2/2011 | Leighton et al. |
| 2011/0131416 | A1 | 6/2011 | Schneider |
| 2011/0154021 | A1 | 6/2011 | McCann et al. |
| 2011/0154308 | A1 | 6/2011 | Lobo |
| 2011/0178973 | A1 | 7/2011 | Lopez et al. |
| 2011/0255689 | A1 | 10/2011 | Bolotov |
| 2011/0296391 | A1 | 12/2011 | Gass et al. |
| 2011/0320816 | A1 | 12/2011 | Yao et al. |
| 2012/0022942 | A1 | 1/2012 | Holloway et al. |
| 2012/0096116 | A1 | 4/2012 | Mislove et al. |
| 2012/0124372 | A1 | 5/2012 | Dilley |
| 2012/0198528 | A1 | 8/2012 | Baumhof |
| 2012/0216251 | A1 | 8/2012 | Kumar et al. |
| 2013/0091582 | A1 | 4/2013 | Chen et al. |
| 2013/0198607 | A1 | 8/2013 | Mischook et al. |
| 2013/0219256 | A1 | 8/2013 | Lloyd et al. |
| 2013/0227397 | A1 | 8/2013 | Tvorun et al. |
| 2013/0232234 | A1 | 9/2013 | Kapur et al. |
| 2013/0263264 | A1 | 10/2013 | Klein et al. |
| 2013/0340043 | A1 | 12/2013 | Zarei et al. |
| 2014/0040787 | A1 | 2/2014 | Mills et al. |
| 2014/0089786 | A1 | 3/2014 | Hashmi |
| 2014/0281535 | A1 | 9/2014 | Kane et al. |
| 2014/0379902 | A1 | 12/2014 | Wan et al. |
| 2015/0058992 | A1 | 2/2015 | El-Moussa |
| 2015/0341385 | A1 | 11/2015 | Sivan et al. |
| 2016/0191351 | A1 | 6/2016 | Smith |
| 2016/0344769 | A1 | 11/2016 | Li |

FOREIGN PATENT DOCUMENTS

| | | |
|---|---|---|
| WO | WO00/72119 | 11/2000 |
| WO | WO02/093369 | 11/2002 |
| WO | WO2004109532 | 12/2004 |
| WO | WO2008095018 | 8/2008 |
| WO | WO2008095031 | 8/2008 |
| WO | WO2008130946 | 10/2008 |
| WO | WO2010/046314 | 4/2010 |
| WO | WO2013091709 | 6/2013 |

OTHER PUBLICATIONS

"Design and implementation of a distributed virtual machine for networked computers"; Sirer et al; ACM SIGOPS Operating Systems, 1999, 15 pages.

Anderson et al., "Measuring the Cost of Cybercrime," 2012 Workshop on the Economics of Information Security (WEIS), [retrieved on Oct. 15, 2013]. Retrieved from the Internet: <URL: http://web.archive.org/web/20130623080604/http://weis2012.econinfosec.org/papers/Anderson_WEIS2012.pdf>, 31 pages, Jun. 2012.

CodeSealer, "CodeSealer," codesealer.com [online] 2013 [captured Aug. 29, 2013]. Retrieved from the Internet: <URL: http://web.archive.org/web/20130829165031/http://codesealer.com/technology.html>, 2 pages.

Cova et al., "Detection and Analysis of Drive-by-Download Attacks and Malicious JavaScript Code," World Wide Web Conference Committee, Apr. 26-30, 2010. Retrieved from the Internet: <URL: http://www.cs.ucsb.edu/~vigna/publications/2010_cova_kruegel_vigna_Wepawet.pdf>, 10 pages.

Currie et al., "In-the-wire authentication: Protecting client-side critical data fields in secure network transactions," 2nd International Conference on Adaptive Science and Technology, 2009, pp. 232-237.

Egele et al., "Defending Browsers against Drive-by Downloads: Mitigating Heap-spraying Code Injection Attacks," Detection of Intrusions and Malware, and Vulnerability Assessment Lecture Notes in Computer Science, 5587:88-106. Retrieved from the Internet: <URL: http://anubis.seclab.tuwien.ac.at/papers/driveby.pdf>, 19 pages, 2009.

Entrust, "Defeating Man-in-the-Browser Malware," Entrust.com [online] Sep. 2012 [retrieved Oct. 15, 2013]. Retrieved from the Internet: <URL: http://download.entrust.com/resources/download.cfm/24002/>, 18 pages.

(56) References Cited

OTHER PUBLICATIONS

Hofmeyr et al., Intrusion Detection using Sequence of System calls, Journal of Computer Security 6(1998).
International Search Report and Written Opinion for Application No. PCT/US2014/024232, dated Aug. 1, 2014, 13 pages.
Li et al., "WebShield: Enabling various web defense techniques without client side modifications," In Proceedings of the 18th Annual Network and Distributed System Security Symposium (NDSS), 2011, 18 pages.
Marcus and Sherstobitoff, "Dissecting Operation High Roller," McAfee [online] 2012 [retrieved on Oct. 15, 2013]. Retrieved from the Internet: <URL: http://www.mcafee.com/us/resources/reports/rp-operation-high-roller.pdf>, 20 pages.
Matsunaka et al., "Detecting and Preventing Drive-By Download Attack via Participative Monitoring of the Web," in Information Security (Asia JCIS), 2013 Eighth Asia Joint Conference on Information Security, pp. 48-55. doi: 10.1109/ASIAJCIS.2013.15.
Oh, "Recent Java exploitation trends and malware," Black Hat USA 2012, Retrieved from the Internet: <URL: https://media.blackhat.com/bh-us-12/Briefings/Oh/BH_US_12_Oh_Recent_Java_Exploitation_Trends_and_Malware_WP.pdf>, 27 pages.
Pattabiraman and Zorn, "DoDOM: Leveraging DOM Invariants for Web 2.0 Application Robustness Testing," 2010 IEEE 21$^{st}$ International Symposium on Software Reliability Engineering, pp. 191-200.
Rieck et al. "Cujo: Efficient Detection and Prevention of Drive-by-Download Attacks," ACSAC 2010, Austin, Texas, Dec. 6-10, 9 pages.
RSA, "RSA Offers Advanced Solutions to Help Combat Man-In-The-Browser Attacks," rsa.com [online] May 18, 2010 [captured Nov. 11, 2011]. Retrieved from the Internet: <URL: http://web.archive.org/web/20111111123108/http://rsa.com/press_release.aspx?id=10943>, 3 pages.
Rutkowska, "Rootkits vs. Stealth by Design Malware," Black Hat Europe, 2006. Retrieved from the Internet: <URL: http://www.blackhat.com/presentations/bh-europe-06/bh-eu-06-Rutkowska.pdf> 44 pages.
SafeNet, "Prevent Financial Fraud and Man-in-the-Browser Attacks," safenet-inc.com [online] [retrieved on Oct. 15, 2013]. Retrieved from the Internet: <URL: http://www.safenet-inc.com/solutions/data-protection/financial-services/financial-fraud-man-in-the-browser-attacks/>, 1 page.
Sedaghat et al., "On-the-fly web content integrity check boosts users' confidence"; Nov. 2002; Communications of the ACM, vol. 45 Issue 11; Publisher: ACM; pp. 33-37.
Sood and Enbody, "A Browser Malware Taxonomy," Virus Bulletin, Jun. 2011. Retrieved from the Internet: <URL: http://www.secniche.org/released/VB_BRW_MAL_TAX_AKS_RJE.pdf>, 5 pages.
Sood and Enbody, "Browser Exploit Packs—Exploitation Tactics," Virus Bulletin Conference, Oct. 2011, Retrieved from the Internet: <URL: http://www.secniche.org/papers/VB_2011_BRW_EXP_PACKS_AKS_RJE.pdf>, 9 pages.
Sood et al., "The Art of Stealing Banking Information—Form grabbing on Fire," Virus Bulletin, Nov. 2011, Retrieved from the Internet: <URL: http://www.virusbtn.com/virusbulletin/archive/2011/11/vb201111-form-grabbing>, 5 pages.
Team Cymru, "Cybercrime—an Epidemic," Queue, 4(9):24-35, Nov. 2006, Retrieved from the Internet: <URL: http://trygstad.rice.iit.edu:8000/Articles/Cybercrime%20-%20An%20Epidemic%20-%20ACM%20Queue.pdf>, 3 pages.
Trusteer, "Trusteer Rapport for Online Banking," [online] 2013 [captured May 11, 2013]. Retrieved from the Internet: <URL: http://web.archive.org/web/20130511162210/http://www.trusteer.com/products/trusteer-rapport-for-online-banking>, 2 pages.
Vasco, "Hardened Browser," vasco.com [online] [retrieved on Oct. 15, 2013]. Retrieved from the Internet: <URL: http://www.vasco.com/products/client_products/pki_digipass/hardened_browser.aspx>, 2 pages.
Sirer, et al, "Design and implementation of a distributed virtual machine for networked computers"; ACM SIGOPS Operating Systems, 1999, pp. 202-216, 15 pages, 1999, 15.
Notice of Publication WO 2017/007705 A1, published on Jan. 12, 2017, for PCT Application No. PCT/US2016/040645.
Notice of Publication WO 2017/007936 A1, published on Jan. 12, 2017, for PCT Application No. PCT/US2016/041337.

\* cited by examiner

DETECTING THE INTRODUCTION OF ALIEN CONTENT

CROSS-REFERENCE TO RELATED APPLICATIONS

This application claims priority under 35 U.S.C. §119(e)(1), to U.S. Provisional Application Ser. No. 61/801,375, filed on Mar. 15, 2013, the entire contents of which are incorporated herein by reference.

TECHNICAL FIELD

This document generally relates to computer security.

BACKGROUND

Computer fraud is big business both for the fraudsters and the people who try to stop them. One common area of computer fraud involves attempts by organizations to infiltrate computers of ordinary people, and by that action to trick those people into giving up confidential information and access codes. The fraudster software may attempt to cause those computers to act automatically in a malicious manner, where such computers are frequently known as "bots." Groups of such computers may act together in concert under the control of a common entity to form what is commonly referred to as a "botnet." Bots may act automatically to carry out illegitimate transactions, e.g., with banks or retailers and using credit card or other financial information of the person who is using the particular computer. Such malicious code may also carry out a "Man in the Browser" attack by which a user's computer can be provided with code that intercepts legitimate communications by the user, such as with the user's bank, and does so after the communications have been decrypted, e.g., by a web browser on the computer. Such malicious code may alter the interface that the user sees, such as by generating an interface that looks to the user like the user's bank is requesting particular information (e.g., a PIN number) when in fact the bank would never request such information via a web page. Alternatively, the malicious code may generate an interface that indicates to a user that a banking or shopping transaction executed as the user requested, when in fact, the illegal organization altered the transaction so as to send the user's money to an entity associated with the organization.

Various approaches have been taken to identify and prevent such malicious activity. For example, programs have been developed for operation on client computers or at the servers of the organizations that own and operate those computers to detect improper activity.

SUMMARY

This document describes systems and techniques by which anomalous actions by "alien" code on client computers can be reported to a central service at a central server system. The central service may then identify clusters in such anomalous actions (i.e., anomalous actions that are sufficient like each other and sufficiently unlike other actions so that they can be identified as being related to each other, and likely generated by a common source of code) to identify code that has been distributed broadly to many machines so that it performs similar operations (i.e., to identify actions that are performed by code from one particular source), and to determine whether such anomalous actions are benign or malicious. Benign actions may be the result, for example, of a legitimate web browser plug-in that many users have installed on their computers for desired purposes. Malicious actions may be the result of hidden code that was secretly added to the users' computers by an unlawful organization attempting to gather private information, or to otherwise set up a botnet or other malicious and/or illegal undertaking.

The abnormal actions may be identified based on actions taken by the alien code that do not match appropriate actions for a web page that a content provider has served to the particular computer. For example, to identify anomalous actions, code for a web page (e.g., HTML, CSS, or JavaScript) may be rewritten when the page is served, by a system that is an adjunct to the web server system, so as to change the manner in which a page is served each time that someone accesses the page. The modifications may differ for different times that a web page and related content are served, whether to the same client computer or to different client computers. Specifically, two different users (or a single user in two different web browsing sessions) may be served slightly different code in response to the same requests, where the difference may be in implicit parts of the code that are not displayed so that the differences are not noticeable to the user or users. For example, the names that are served to a client device for various software objects may be changed in essentially random ways each time a page is served.

Such rewriting may introduce randomness (a moving target) that prevents malicious parties from reverse-engineering the operation of the code and writing bots to exploit the page. Where such bots have been written without knowing that the code is being revised by the server system, they may try to interact with the original code. The rewritten web page code may be provided to clients along with instrumentation code that can identify and report to the server system such action (where the reports may be part of the server system operated by an entity that is different than the entity that operates the web server part of the system, or they can be the same entities).

Alternatively or in addition, code may be provided that periodically analyzes the document object models (DOMs) on various machines that have loaded code for a particular web site or page, and may walk the DOM and produce a compact representation of the DOMs. For instance, the added code may compute a hash of the content (or part of the content), multiple hashes of the content (or part of the content) at different times, or some other representation of the DOM or a portion of the DOM. Such code (e.g., added JavaScript) may also compute changes between DOMs on particular client devices over time (e.g., at certain defined states for a page, such as before and after a user of the device has carried out a process for ordering an item from an on-line store or a process for making a change in a banking account). The added code may then report to the server system the information that it has identified about the particular DOMs.

The code may also gather and report additional meta data that identifies the state or context of the device, such as an IP address for a particular device (which can be used to identify a geographic location of the device), a device ID, the brand and version of the web browser that rendered a page, information about plug ins running in the browser, GPS information that may identify a location of the device, and other such information. In one example, the added code may compute a hash of a difference to a DOM (or a portion of the DOM) before and after a particular operation, such as a user clicking on a button related to a purchase process, and may report the hash to the central system, since hashes permit for relatively easy and inexpensive comparison and analysis.

As such, malicious activity can, in certain implementations, be both deflected (so as to prevent malicious code from working at all) and detected (so as to block the successful operation of malicious code once it begins operating, and perhaps to identify the fraudster) in relatively sophisticated manners by changing the environment in which executable code on the client device, such as JavaScript, operates (in addition to changing corresponding references in the HTML code). As one example, a common method for making changes to a document object model (DOM) for a web page is the document.write method, and may be used by malicious code to surreptitiously change what the user of a computing device sees on a web page. A security system can (1) instrument served code corresponding to such a method so that the instrumentation code reports calls to the method, and additional includes data that characterizes such calls, so that the system can detect abnormal activity and perhaps use the additional data to determine whether the abnormal activity is malicious or benign; and (2) change the function name to "document.#3@1*87%5.write," "1@2234$56%.4$4$345%4.@12111@", or some other legal name that includes random text that can be changed automatically each time the code is served. Such constant changing creates a real challenge for a malicious party seeking to write code that can keep up with the changes, and also flags the presence of the malicious code when it attempts to interact with an outdated method name, and is reported by the instrumentation code. Other examples of JavaScript actions that can be instrumeand continually changed include "getElementById," "getElementByName," XPath commands, and setting of HTML elements in the DOM to particular values.

The server system may then store the received information that comes from such extra code running on a large number of different client devices, and may analyze a representation of such aggregated received information to identify common anomalous activity by different devices. For example, particular features may be identified by an operator of the server system as features that are relevant to identifying the presence of malicious activity, such as geographic location, browser types, particular elements of the DOM, and the like.

To perform such analysis, each such feature may be assigned a dimension in a hyperplane or similar data representation. The hyperplane may then be analyzed by a learning engine to identify the emergence of clusters or other relevant patterns in the data. Clustering in various hyperplanes may either be computationally easier to perform than other techniques, and may indicate the presence of alien code that is more pronounced in certain circumstances. For example, focusing only on data points that exist from a particular class of browser may escalate the instance of DOM abnormalities above a recognizable threshold. Simultaneous clustering in multiple planes may indicate that a particular exploit is being attempted on a particular brand or version of browser (e.g., a zero day exploit). Other similar clusters may also be identified so as to identify the presence of alien content on particular client computers.

Such clusters may then be further analyzed to determine whether the alien content is benign or malicious, and if malicious, what to do about it. For example, whenever multiple clusters are present, the clusters may be analyzed for the presence of previously-identified alien content. This content may be identified as having been inserted by previously identified legitimate plug-ins in which case the result can be safely ignored. Thus, the presence of content known to be benign may "excuse" a certain event that is showing up in a population of computers. The content may conversely be identified as having been inserted by previously identified malware/crimeware/vandleware/etc. In this case, information about infected endpoints can be exported to a system that can block further transactions from the endpoints or to other systems that may be used to audit transactions by a particular endpoint.

The analysis discussed here may be performed for a particular web site, or web domain, or across multiple different sites—e.g., by a third party that provides web security products and/or services to operators of web domains. In one example, such a cross-domain operator may identify common interactions that occur across the different domains, e.g., if multiple of the domains use common underlying storefront software, the operator may look at differences in DOMs for those web sites before and after a common action, such as user selection of a particular button shown on a web page, such as a button that causes an order of merchandise to be executed. A malicious party may be assumed to focus on such an event for intercepting information, so that the difference across such an action will differ as between a "clean" client computer and an infected computer.

Such detection activity across multiple different web transactions or sessions may also occur in coordination with other activities so as to deflect malicious actions for particular transactions or sessions (i.e., deflection can occur at the individual clients and at a central server system, and can occur with or without initial detection). For example, instrumentation code that is added to code that has been provided by a web server system may identify other anomalous activity and alert the underlying web server system. In such a situation, the web server system may carry out the transaction in a manner that the malicious party believes nothing to have happened, but in fact, the web server system may avoid carrying out an actual underlying financial transaction.

For example, the code that is served to requesting clients, in addition to or as an alternative to being randomly modified so as to prevent reverse-engineering at network endpoints, may be supplemented with instrumentation code that is programmed to identify alien content in the rendered web page on the client. That code that runs on the client may, for example, be programmed to identify a function call for a function name that does not match function calls that are permissible for a particular served web page (e.g., where the alien call may be one that matches the page originally provided by a web server but does not match the revised name generated by the techniques discussed in the prior paragraph). Such alien content may simply be an indication of benign or otherwise legitimate code that is installed on the client, such as a plug-in to his or her browser, or it may also be an indication that the user's computer has become infected with malicious code (e.g., JavaScript code).

In one implementation, a computer-implemented method for identifying abnormal computer behavior may include receiving, at a computer server subsystem, data that characterizes subsets of particular document object models for web pages rendered by particular client computers; identifying clusters from the data that characterize the subsets of the particular document object models; and using the clusters to identify alien content on the particular client computers, wherein the alien content comprises content in the document object models that is not the result of content that is the basis of the document object model served.

This and other implementations described herein can optionally include one or more of the following features. The data that characterizes subsets of the particular document object models can be generated by code that is provided by the computer server subsystem and to the particular client computers in coordination with the web pages. The code that is provided by the computer server subsystem can identify changes to the document object model upon the occurrence of events relating to the web pages. The events can comprise defined user selections of an object on the web pages. The code provided by the computer server subsystem performs reduction processes to generate strings that are substantially smaller than the document object models and that characterize content of the document object models. The reduction processes can comprise a hash function that is performed on at least portions of the respective document object models. The clusters can be identified by plotting data from particular ones of the client computers on a hyperplane.

These and other implementations described herein can optionally include one or more of the following features. The hyperplane may be defined by dimensions that correspond to particular features of the web pages identified as being relevant to determining whether the actions are benign or malicious. Using the cluster to identify alien content can include identifying whether the clusters correspond to features previously identified as being related to benign variations in client computers.

The method may further include sending, by the computer server subsystem, at least a portion of the data that characterizes subsets of particular document object models to a central security server, wherein the central security server is configured to receive data from a plurality of computer server subsystems, wherein particular ones of the plurality of computer server subsystems serve different web domains. The method can further include receiving, at the computer server subsystem, data that indicates context of at least one of (i) the web pages and (ii) the particular client computers. The data that indicates context can comprise information that identifies the particular client computers, an application that rendered the web page at particular ones of the client computers, and/or a web site or a web domain for which particular ones of the web pages were served. Identifying clusters from the data that characterizes the subsets of the particular document object models can include using the data that indicates context.

The hyperplane may be defined by dimensions that include at least one of an identifier of the particular ones of the client computers, an identifier of an application that rendered the web page at particular ones of the client computers, and an identifier of a web site or a web domain that served particular ones of the web pages.

The clusters can be identified based at least in part on identities of particular ones of the web pages or on identities of web domains that served particular ones of the web pages. The method can further include determining whether the identified alien content is benign or malicious. Determining whether the identified alien content is benign or malicious may include comparing the identified alien content to other alien content that has previously been identified as benign or malicious.

In one implementation, a computer system for identifying abnormal computer behavior can include: one or more computing devices; an instrumentation module installed on the one or more computing devices that is configured to supplement web code with instrumentation code that is executable on a client device and that can collect information about execution of the web code at the client device, wherein the information includes representations of a document object model of the web code; and a security monitoring module installed on the one or more computing devices that is configured to analyze information received from a plurality of client devices that was collected by instrumentation code on each of the plurality of client devices to identify alien content on the client devices.

In one implementation, a computer-implemented method for identifying abnormal computer behavior can include receiving, at a security server, information that characterizes execution of one or more web resources by multiple client computing devices. The information can be generated by instrumentation code injected into web code of the one or more web resources, and the instrumentation code can be programmed to cause the client computing devices to detect and report representations of the information that characterizes the execution of the one or more web resources. The method can further include identifying, based on the information that characterizes the execution of the one or more web resources by the multiple client computing devices, a subset of executions of the one or more web resources that deviated from an expected execution of the one or more web resources. The method can use information from the subset of executions of the one or more web resources to identify alien content on particular ones of the plurality of client computing devices that correspond to the subset of executions of the one or more web resources.

This and other implementations described herein can optionally include one or more of the following features. The one or more web resources can include web pages that are executed by standard web browser applications on the plurality of client computing devices. The information that characterizes execution of the one or more web resources can include information about user interactions with the web pages. The information that characterizes execution of the one or more web resources can include information about the client computing devices or the environments in which the one or more web resources were executed. The information that characterizes execution of the one or more web resources can include representations of Document Object Models (DOMs) of the web pages. Identifying the subset of the executions of the one or more web resources that deviated from the expected execution of the one or more resources can include identifying clusters of particular executions of the one or more web resources in a hyperplane.

In certain implementations, such systems and techniques may provide one or more advantages. For example, retail vendors, banks, and other organizations that are subject to attack can identify such attacks earlier and in a more accurate manner. Anomalous code that is malicious can also be distinguished more readily from anomalous code that is benign. The use of modified code and the identification of an attack as occurring when attempts are made to communicate with the unmodified code may also permit attacks to be deflected entirely (because malicious code simply will not work) and also to detect such attacks (because attempts to interact with the unmodified code are a flag that something is amiss). Moreover, attacks may be identified as they occur on a client device so that the attacks can be both deflected and detected. The attacks may also be identified more readily because identification occurs across a large number of client devices.

Other features and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1A:
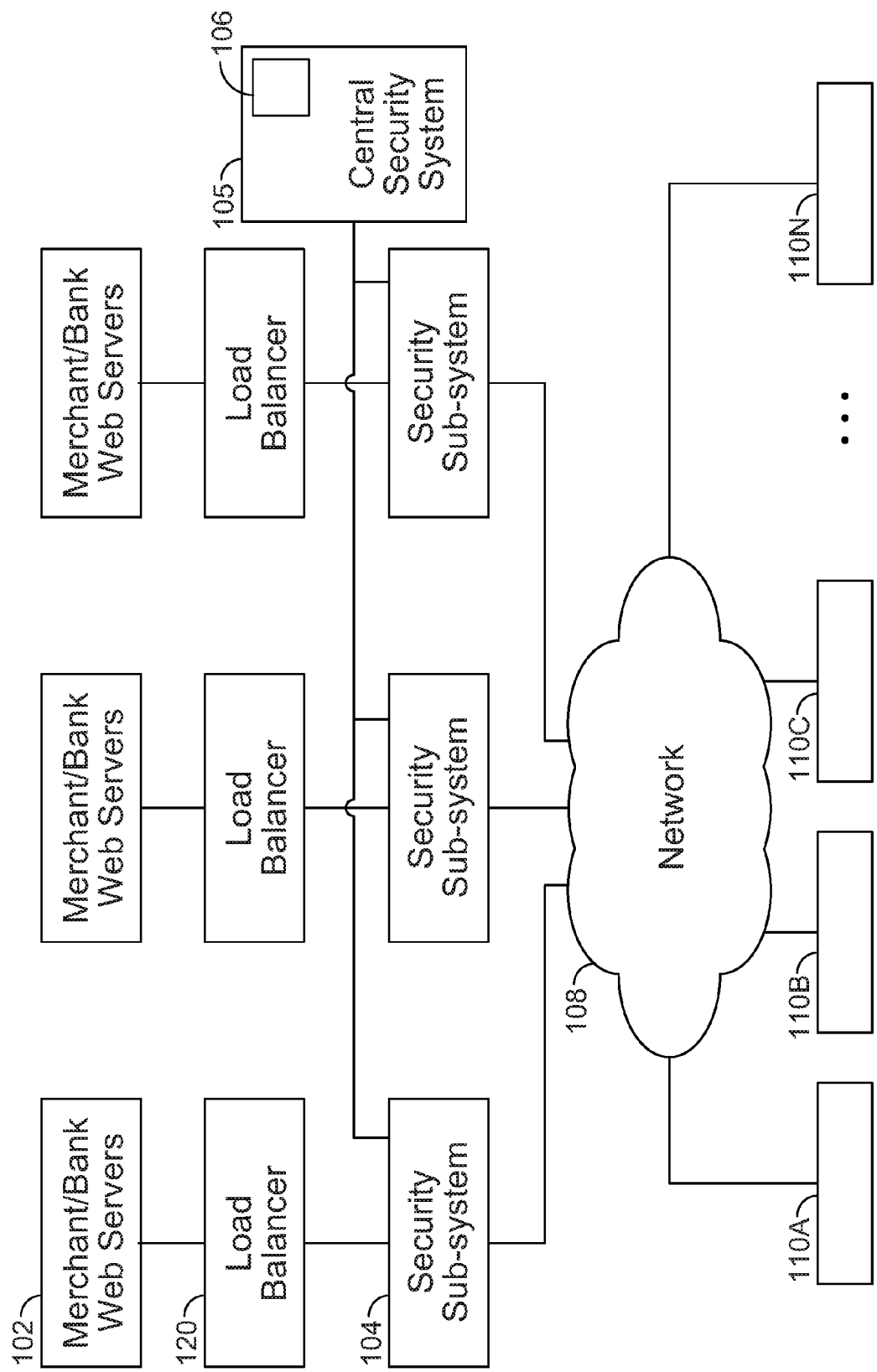
FIG. 1A depicts a schematic diagram of an example system for serving web code and monitoring actions of client computers to identify anomalous and potentially malicious activity.
Figure 1B:
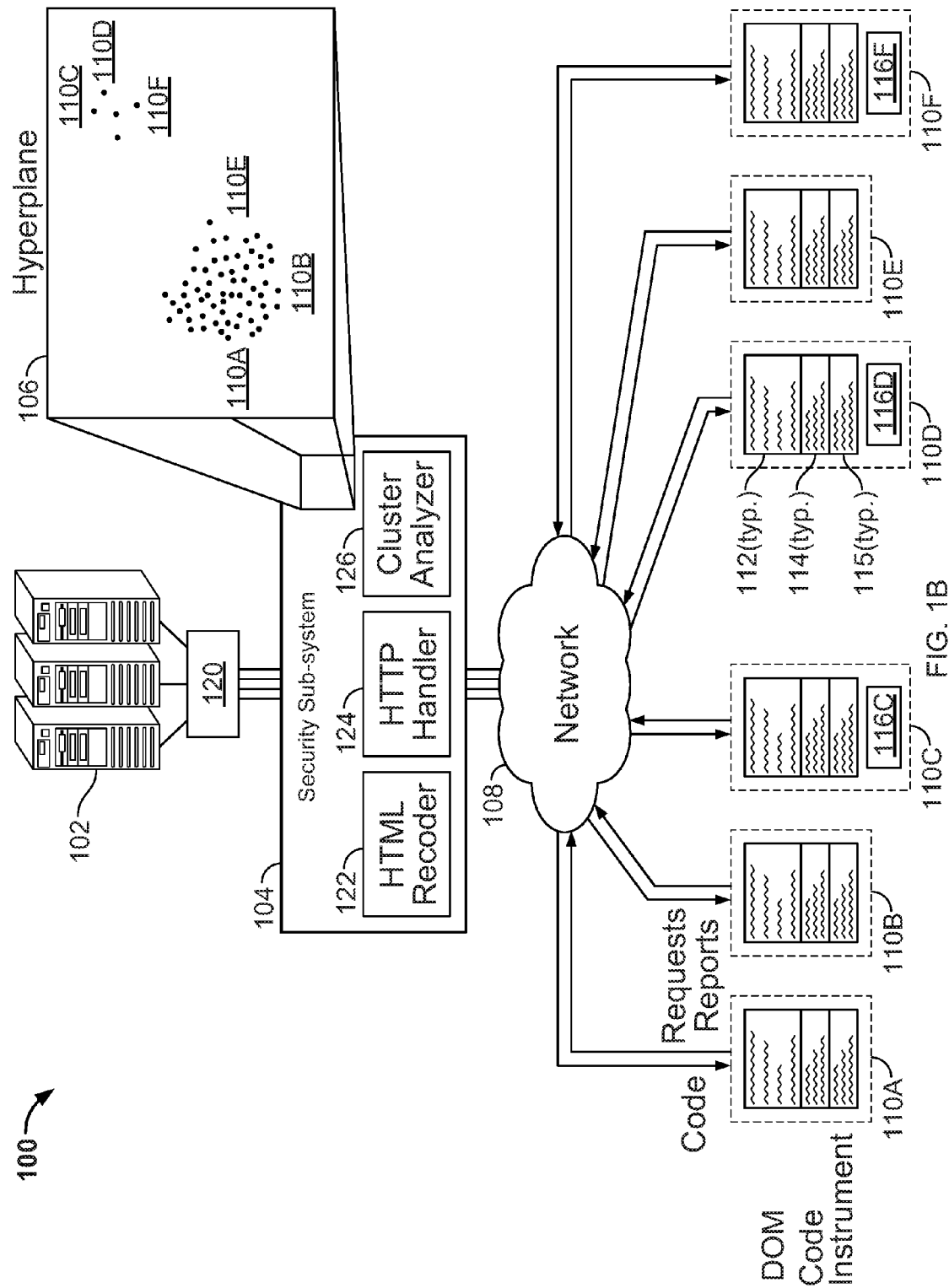
FIG. 1B depicts one example implementation of the system from FIG. 1A.

FIGS. 1A and 1B are schematic diagrams of a system 100 for serving code and monitoring actions of client computers to identify anomalous and potentially malicious activity. In general, the system 100 is arranged to serve to clients code that has been modified from the manner it is served by standard web servers, and modified in a manner that cannot be readily predicted by code on the clients. The manner in which code on the clients interacts with the modified code (or even with unmodified code provided by web servers in response to client requests) may be reported to the system 100, which may identify patterns, such as clustering, in such reports so as to identify the presence of code that has been spread across many clients. The system 100, upon identifying such alien code, may then operate to determine whether it is malicious or benign, and then to properly interoperate with it so as to protect user of the client computers and operators of the web server systems from being defraded or otherwise harmed.

The system 100 may include one or more sets of web servers 102 for providing content, a security subsystem 104 for each set of web servers 102, a load balancer 120 for each set of web servers 102, a central security system 105, and client computing devices 110 that are connected to a network 108 and that may communicate with the web servers 102 through the network 108. Each set of web servers 102 may serve a domain for a particular website. FIG. 1A depicts an example embodiment of multiple sets of web servers 102 that serve a plurality of web domains, and FIG. 1B depicts an example embodiment of one such set of web servers 102 that serves a domain for a particular website.

The web servers 102 can respond to requests from the client devices 110 with a resource, such as a web page, an e-mail, a PDF, or other media file. Before sending the resource to the requesting client 110, the security subsystem 104 may receive the resource through the load balancer 120 so that the subsystem 104 can process the resource. In some implementations, the security subsystem 104 may modify portions of web code (e.g., HTML, JavaScript, CSS, etc.) associated with the resource to obscure operation of the web servers 102 from which the resource originated. For instance, by randomly modifying the structure and/or implicit API (e.g., function names, attribute values, link targets, etc.) of the resource that the security subsystem 104 delivers to a client device 110 (e.g., through a load balancer 120) each time the resource is served (e.g., from one session to another), the security subsystem 104 can deter or prevent malicious attacks, such as a man-in-the-browser attack. Such attacks can threaten the security, privacy, or financial interests of users of the client devices and/or the web servers 102. An HTML encoder module in the security subsystem 104 can perform the modifications described.

Alternatively, or in addition to modification of the source code associated with provided resources, the security subsystem 104 can supplement the resource with instrumentation code for use in detecting abnormal behavior that may occur at the client device 110. Abnormal behavior may include any event that the instrumentation code would not expect to occur at the client 110 based on an expected execution of the requested resource by the client 110, including, for example, normal interaction with the resource by a user. Some occurrences of abnormal behavior that the instrumentation code can detect may be malicious, such as from man-in-the-middle exploits, and other behavior may be benign. In some implementations, the instrumentation code may be programmed for execution by the client device. Where the instrumentation code detects an occurrence of abnormal behavior, it may capture information associated with the occurrence, generate a report that includes such information, and transmit the report to the security subsystem 104 or to another remote computing system such as the central security system 105.

Information about detected occurrences of abnormal behavior at the client devices 110 can be analyzed to determine information that may be used, for example, to maintain or increase security in the future for one or more web sites, client devices, networks, or security subsystems. In some implementations, the analysis can occur at the security subsystem 104 and/or at a central security system 105. The analysis may be based on information about many detected occurrences of abnormal behavior. For example, the analyzed occurrences may include information from multiple client devices 110, multiple computing sessions, and/or multiple web sites.

In some embodiments, large amounts of information from client devices 110 can be aggregated to identify clusters that can be used in identifying and analyzing abnormal behavior. For instance, the system 100 may analyze information from multiple client devices 110 in a hyperplane. The hyperplane may have dimensions that correspond to features that were collected about the occurrences of abnormal behavior on the client device. In some dimensions of the hyperplane, occurrences may occur relatively near each other such that the occurrences are determined to form a cluster. Using information about such clusters, the system 100 may determine information such as whether particular occurrences were likely caused by alien content at the client devices, and whether the alien content was more likely a form of hidden malicious code, or instead benign software such as legitimate browser plug-ins. Occurrences (e.g., nodes) in the hyperplane can correspond to samples of information from particular ones of the client devices 110 that indicate abnormal behavior and/or other information gathered from the client devices 110 such as representations of a document object model (DOM) of a web page executed by a particular client device 110.

Describing some example implementations of the system 100, the web servers 102 (which in normal implementation would be implemented in a large number of physical or virtual servers across one or more data centers, such as in one or more racks of servers) may host electronic resources and provide services over one or more networks 108 such as the internet. For example, the web servers 102 may serve code for pages of one or more websites by storing resources for each website such as HTML pages, scripts, images, media, and user data at the web servers 102, and providing the resources upon request. For instance, the web servers 102 may receive an HTTP request from a client device 110 that requests the web servers 102 to provide the client device 110 with a code for generating a webpage. In response, the web servers 102 retrieve one or more resources associated with the request and transmits them to the requesting client device 110.

The web servers 102 may respond to an HTTP request by serving an HTML file that represents a webpage. The HTML file may reference other resources such as advertisements (or other text), images (which may be part of advertisements or other content), JavaScript code, or Cascading Style Sheets ("CSS") that the client device 110 can use to load and present the webpage to a user. The web servers 102 may provide the referenced files to satisfy the initial request, or may provide the files in response to subsequent requests from the client device 110.

The web servers 102 can be implemented with various combinations of software and hardware. In some implementations, the web servers 102 can support services other than or in addition to HTTP, including FTP, SSH, TelNet, and/or IMAP, POP, and SMTP for e-mail services. The web servers 102 may also support secure connections such as through SSL and HTTPs protocols. Various proprietary, open-source, or commercial software products may be used in implementing the web servers 102. Also, the web servers 102 can be comprised of one or more computing devices, such as a distributed server system with multiple connected devices that each provide portions of the operations (e.g., as a server bank, a group of blade servers, or a multi-processor system).

Each client device 110 is capable of communicating information with the web servers 102 over a network 108 such as the internet. The client device 110 can be implemented by any of a variety of appropriate desktop or mobile devices such as a desktop computer, notebook, smartphone, or tablet. The client device 110 may include a network interface card or other hardware for communicating over a wired or wireless network that is connected to the network 108. The client device 110 may also include software, such as a web browser or one or more native applications, to allow a user of the client device 110 to request, load, and interact with web resources such as HTML pages and JavaScript applications from one or more websites served by the web servers 102.

Malware 116 may be present on one or more client devices 110 that communicate with the web servers 102. As depicted in FIG. 1B, malware 116 has infected particular ones of the client devices 110C, 110D, and 110F, but not others of the shown client devices 110. Malware 116 can include any software that exploits operations of a client or remote computing system such as the web servers 102. Malware 116 may engage in various malicious behaviors, including attempts to gather private, digitally-stored information about users such as identification or financial information. Attackers can also use malware 116 to access secure computer systems without authorization, destroy digital information, or gain control of a computer system from an authorized user. Malware 116 may include viruses, Trojan horses, spyware, adware, and other malicious software. Attackers have developed sophisticated methods to deploy malware 116 on client computing devices 110. For example, using phishing and other social engineering techniques, attackers may deceive users into accessing a resource that installs malware 116 on the user's computing system without notice or detection.

Some malware 116 can exploit security vulnerabilities in the client device 110 (including in a browser or browsers executing on the client device 110) to obtain sensitive user account information and to initiate fraudulent transactions. Attackers may use man-in-the-middle attacks, for instance, to intercept communications between the client device 110 and the web servers 102. Even where a secure communication protocol is used between the client device 110 and the web servers 102, some malware 116 can intercept communications (e.g., after they have been decoded on the client device 110), log information about the communications, and even alter such communications.

In man-in-the-browser attacks, the malware 116 may compromise a web browser executing on client device 110 such that the malware 116 activates when a user visits a particular website (so that the browser executes code served for the web page and renders it on the device 110). The malware 116 may access information about the website even after code for the site is decrypted, and in some instances, the malware 116 may inject extra code such as HTML or JavaScript to create malicious forms that prompt users to divulge confidential information that can later be transmitted to attackers for further use. Man-in-the-browser malware 116 may also alter an HTTP request from the client device 110 without the user's knowledge to divert a request to an unauthorized server or to implement a fraudulent transaction. For example, in a banking transaction, malware 116 in the client computing device 110 may alter the destination account number in a wire transfer to deliver funds to a mule account rather than an account specified by the user. Some malware 116 may passively reside in the client device 110 to monitor features of a site so that manual or automated attacks on the site's web servers 102 can be made at a later time.

Security subsystems 104 may include one or more computing devices (e.g., physical or virtual server instances) that are situated between the client computing devices 110 and the web servers 102. The security subsystem 104 receives and processes at least a portion of traffic transmitted between the web servers 102 and other computing devices that interact with the web servers 102, such as the client devices 110. In some implementations, the security subsystem 104 may be a physical or virtual subsystem of the web servers 102. The security subsystem 104 may be configured to modify and/or analyze web code transmitted to and from the web servers 102 to detect alien (i.e., abnormal) transactions that may be malicious, and to deter or incapacitate the malware 116 by randomizing components of content served from the web servers 102 in order to diminish the predictability of such content that is provided to the client devices 110.

The security subsystem 104 may forward content from one of the web servers 102 to designated client devices 110, and/or it may intercept such content from the web servers 102 for further processing before the content (e.g., resources such as web pages) is received by a requesting computer device such as one of the client devices 110. For example, the security subsystem 104 may receive content from the web servers 102 through a direct connection with the web servers 102 or through a wide/local area network ("WAN"/"LAN") before transmitting the content over the internet 108. Conversely, the security subsystem 104 may also receive incoming traffic destined for the web servers 102 so that it can process the traffic before the traffic is received by the web servers 102.

In some implementations, the security subsystem 104 may be configured as a reverse proxy server that appears to client devices as if the security subsystem 104 is one of the web servers 102 that provides the electronic resources. In certain implementations, different subserver systems can be used for outgoing service of code and incoming processing of requests, with the subsystems communicating so that one system can provide reverse translations to the translations originally provided by the first subsystem. Such coordination may occur, whether a single security subsystem is used or multiple subsystems are used, such as by storing a cookie or similar identifier on client devices 110, where the identifier can be used as a public key for performing the transformations (where server-side security for private resources can be reliably maintained).

The security subsystem 104 may include one or more computing devices that are separate from computing devices of the web servers 102. In such implementations, the security subsystem 104 may communicate directly with the web servers 102 through a networking cable such as an Ethernet cable or fiber optic line (and typically through many such connections). The security subsystem 104 can also communicate with the web servers 102 through a network such as a local area network ("LAN"). In some instances, the security subsystem 104 can be installed on the same premises as the web servers 102 so that operators or administrators of the web servers 102 can also maintain the security subsystem 104 locally (particularly for large-volume applications). Installing the security subsystem 104 in close proximity to the web servers 102 can have one or more additional benefits including reduced transmission latency between the security subsystem 104 and the web servers 102 and increased security that stems from a private connection between the security subsystem 104 and the web servers 102 that is isolated from public networks such as the internet 108. This configuration can also avoid any need to encrypt communication between the security subsystem 104 and the web servers 102, which can be computationally expensive and slow.

In some implementations, the security subsystem 104 may include one or more computing devices that are separate from the computing devices of the web servers 102, and that are connected to the web servers 102 through a public network such as the internet 108. For example, a third-party security company may maintain one or more server subsystems 104 on the security company's premises. The security company may offer services to protect websites and/or web servers 102 from exploitation according to the techniques described herein. The security subsystem 104 could then act as a reverse proxy for the web servers 102, receiving outbound traffic from the web servers 102 over the internet 108, processing the traffic, and forwarding the processed traffic to one or more requesting client devices 110.

Likewise, the security subsystem 104 may receive over the internet 108 incoming traffic from client devices 110, process the incoming traffic, and forward the processed traffic to the web servers 102 over the internet 108. In this configuration, communication between the security subsystem 104 and the web servers 102 may be encrypted and secured using protocols such as HTTPS to authenticate the communication and protect against interception or unauthorized listeners over the internet 108. In some embodiments, a private line or network may connect the web servers 102 to the remote security subsystem 104, in which case the system 100 may use unencrypted protocols to communicate between the security subsystem 104 and web servers 102.

In some implementations, security subsystem 104 may be a virtual subsystem of web servers 102. For example, the one or more computing devices that implement web servers 102 may also include software and/or firmware for the security subsystem 104. The system 100 may include the security subsystem 104 as software that interfaces with, and/or is integrated with, software for the web servers 102. For example, when the web servers 102 receives a request over the internet 108, the software for the security subsystem 104 can first process the request and then submit the processed request to the web servers 102 through an API for the web servers 102 software. Similarly, when the web servers 102 responds to a request, the response can be submitted to the security subsystem 104 software through an API for processing by security subsystem 104 before the response is transmitted over the internet 108.

In some configurations of the system 100, two or more server subsystems 104 may serve the web servers 102. Redundant server subsystems 104 can be used to reduce the load on any individual security subsystem 104 and to protect against failures in one or more server subsystems. The system 100 can also balance traffic among two or more server subsystems 104. For example, the system 100 may categorize traffic into shards that represent a logical portion of traffic to or from a website. Shards may be categorized according to client identity, network information, URL, the domain or host name in an HTTP request, identity of resources requested from the web servers 102, location of resources requested from the web servers 102, and/or the content of a request or the requested resource 104.

The security subsystem 104 can process traffic transmitted to and from the web servers 102. Processing traffic may include analyzing web code to identify alien or malicious activity, reversibly modifying web code to obscure elements of resources provided by the web servers 102, and/or inserting instrumentation code into web code provided by the web servers 102 to facilitate detection of alien or malicious activity at the client computing device 110. The security subsystem 104 can also apply reverse modifications on requests or other information transmitted by client devices 110. Reverse modifying of requests can effectively make the security subsystem's 102 operations transparent to the web servers 102. This document sometimes refers to reverse modifications as inverse modifications and these terms are intended to have the same meanings unless indicated otherwise.

The security subsystem 104 can make various modifications to outgoing web code. Such modifications can apply to all or a portion of the code served by web servers 102. For example, to limit the bandwidth required by the security subsystem 104, an operator of web servers 102 may mark HTML code for particular pages that are believed to be most likely subject to improper attack, such as pages on which a buying transaction for an on-line store will occur, or monetary transactions for an on-line banking application will occur. The security subsystem 104 may pass pages that do not include such HTML code, but can re-write pages that do.

In one example, the security subsystem 104 can make random or pseudo-random changes (both of which are covered by the term "random" in this document unless indicated otherwise) in HTML attribute values in links and/or forms, which the client 110 may translate directly into HTTP protocol elements in subsequent requests to the web servers 102. For instance, a web server 102 for an online retailer at www.examplestore.com can provide a text field in a checkout page for a user at the client device 110 to input his or her shipping address. The original HTML web code from the web servers 102 may include an HTML tag to create the field: <input type ="text" name=shippingaddress>. To obstruct attempts by malware 116 that may have compromised the client device 110 to exploit the field and engage in a fraudulent transaction, the security subsystem 104 can replace one or more attributes for the field, such as by generating a pseudo-random value for the 'name' attribute to replace 'shippingaddress.'

The security subsystem 104 may then forward the modified HTML for the webpage to the client device 110. The client device 110 may then generate HTTP requests for the web servers 102 that include the modified attribute, such as in a POST request that references the pseudo-random 'name' attribute value. When the security subsystem 104 receives the client device 110 POST request, it applies a reverse modification to the attribute value, replacing the pseudo-random value with the original 'shippingaddress' value, and then forwards the request to web servers 102. The security subsystem 104 may store or access translation tables to apply the reverse modifications, or use encrypted content in information associated with the request to apply reverse modifications.

In some implementations, the security subsystem 104 can supplement a requested resource with code that changes the environment in which a client-side script is executed in association with the resource at the client device 110. For example, malicious code (i.e., malware 116) such as man-in-the-browser bots may call particular functions or methods that interact with a document object model ("DOM") for a web page in order to modify or generate a feature on the web page that can be used for malicious purposes. The security subsystem 104 can modify the environment for interacting with the DOM so as to frustrate attempts by malware 116 to engage in unauthorized activity. JavaScript functions, for instance, can be changed, so that, for instance, the document.write method, as a browser-based script would normally call the method, is translated to a random name such as document.#3@1*87%5.write (or even more obscurely to Hkj*&.*&^.7y$56.hTy30@, for example, leaving none of the original method name). Along with the environment for calling such functions, portions of JavaScript associated with the requested resource can be changed to interact with the modified environment appropriately. However, attempts by malware 116 to interact with the resource's environment are frustrated because the malware 116 cannot determine how to properly call the functions or methods required to carry out the malicious activity.

The security subsystem 104 can apply different modifications to web code each time the code is served to one or more client devices 110—whether to a single device across different calls for content, a single device across separate web browser sessions (though making the same modifications within a particular session), or between two different devices (where device identification may be performed by standard mechanisms such as using cookies). Applying different or unique modifications before the code is ultimately delivered to the client 110 can frustrate attempts by malware 116 in the client to study and/or exploit the structure of a website or other web application. Each time the web servers 102 provide a particular resource, such as a web page, the security subsystem 104 can apply different and unique modifications to the page. Modifications may vary across different users, different clients 110, different sessions, and even different page loads for the same user. For example, a user at client device 110 may receive a particular page with one set of modifications during a first session, and different, second set of modifications during a different session. Similarly, for users at different client devices 110 that request the same resource from web servers 102, the security subsystem 104 may apply different modifications to each resource, even if the users made their requests at substantially the same time. By modifying content differently each time it is served, the security subsystem 104 creates a moving target that obstructs attempts by malware 116 to determine a "normal" structure of the site or to identify patterns in the structure of a site. Performing such random modifications makes it more difficult for malware 116 to successfully initiate a fraudulent transaction with the web servers 102 or otherwise engage in unauthorized activity.

Malicious activity can be both detected and deflected in relatively sophisticated manners by the server subsystem 104 by changing the environment in which executable code, such as JavaScript, on the client device 110 operates. Detection can occur by identifying certain JavaScript operations or calls that may be made on a page, and instrumenting code that is served with a web page so as to report to a security server system when such operations occur and/or such calls are made (along with information that describes the actions).

Deflection occurs, for example, by the constant changing of code elements as they are served each time, such as changing the names of elements that will be called by malicious JavaScript, so that the malicious code can never catch up with the changes and thus gives itself away when it tries to interoperate with code known by the system to be stale. As one example, a common method for making changes to a DOM for a web page is the document.write method, and may be used by malicious code to surreptitiously change what the user of a computing device sees on a web page. A security system can (1) instrument served code corresponding to such a method so that the instrumentation code reports calls to the method, and additional includes data that characterizes such calls, so that the system can detect abnormal activity and perhaps use the additional data to determine whether the abnormal activity is malicious or benign; and (2) change the function name to "document.#3@1*87%5.write" or some other legal name that includes random text that can be changed automatically each time the code is served.

Such constant changing creates a real challenge for a malicious party seeking to write code that can keep up with the changes, and also flags the presence of the malicious code when it attempts to interact with an outdated method name, and is reported by the instrumentation code. Other examples of JavaScript actions that can be instrumented and continually changed include "getElementById," "getElementByName," XPath commands, and setting of HTML elements in the DOM to particular values. Such techniques for changing the environment in which executable code operates at the client device 110 can be implemented in coordination with or alternatively to other techniques for detecting and deflecting abnormal and malicious activity such as modifying the static values of a web page's implicit API (e.g., randomizing hyperlink targets and form attribute values).

In FIG. 1B, the server subsystem 104 in one implementation is shown to interact with multiple client devices 110A-F, each of which is executing a particular requested resource. The executing resources may be provided by web servers 102 and instrumented with code by the server subsystem 104 for detecting (and possibly deflecting) malicious activity or other abnormal computer behavior. For instance, the resource may be a web page executing in a client browser. A DOM 112 is associated with each web page, as well as web code 114 (e.g., HTML, JavaScript, CSS) that defines how the page is to be interpreted, and instrumentation code 115 with which the server subsystem 104 instrumented the page.

The server subsystem 104 can configure the instrumentation code 115 to log and report information about the client device 110 that executes the requested resource, as well as information about activity that occurs on the client device 110 in association with executing the resource. Such information can be used to identify alien content on the client device 110 that may cause the client 100 to execute or interact with the requested resource in ways that would not normally occur in the absence of alien content. Alien content may be benign, such as a browser plug-in that modifies the DOM of a web page to add a customized toolbar for the user, or alien content may be malicious, such as the malware 116 that resides on client devices 110C, 110D, and 110F.

Information determined by the instrumentation code 115 may be periodically or asynchronously transmitted to the server subsystem 104, such as after a certain amount of information has been detected and logged, upon detection of certain events, or after a predetermined amount of time. In some implementations, such information can also or alternatively be provided to the server subsystem 104 upon request. The information can also be included in HTTP requests that the client device 110 subsequently makes to the web server 104, such as where a user selects a link for another web page, where a user posts data submitted in a form on the page, or where the client makes asynchronous requests to the web server 104 for additional content associated with the web page, using for example, AJAX calls or a web socket.

The instrumentation code 115 may detect, log, and/or report various information from the client device 110. For instance, the instrumentation code 115 may analyze the DOM of a web page and gather information about the DOM to report to the server subsystem 104. Alien content, such as a man-in-the-browser or a user-authorized browser plug-in, may alter the content and structure of the DOM, thereby impacting how the web page executes on the client device 110. Therefore, information about the DOM can be useful in identifying alien content. In some implementations, the instrumentation code 115 may generate compact representations of the DOM to report to the server subsystem 104 (or other security server). For instance, the instrumentation code 115 may "walk" the DOM (or a portion of the DOM), and perform reduction processes to generate strings or other data structures that are substantially smaller than the DOM and that characterize its content.

The reduction processes may include a hash function that is performed on portions of the DOM. Representations of differences in the DOM that occur over time while a web page executes or before and after an event such as a user selection occurs can also be collected and reported by the instrumentation code 115. The instrumentation code 115 may also be configured to identify portions of the DOM that are likely to be most relevant to determining information about possible alien content. For instance, the instrumentation code 115 may target portions of the DOM that are most likely to be affected by abnormal behavior and/or alien content such as elements that load content or introduce content such as images or scripts, that direct the user to another location (e.g., a link), that collect information from a user such as form fields, AJAX calls, or elements that can be used to modify the DOM.

The instrumentation code 115 may also collect information about particular activity that occurs on the client device 110. For instance, the instrumentation code may collect information about how a user interacts with the web page such as key strokes, mouse movements, changes in focus between particular forms, fields, or frames, and patterns and timing of interactions with the page. Information about the user's operating environment may also be collected, such as network configurations, operating system information, hardware specifications, performance indicators, session identifiers, other cookies, browser type, browser settings, IP address, MAC address, client device type, plug-ins, screen resolution, installed fonts, timestamp, site or page identifier, GPS data, etc. In some implementations, users and system operators can configure the instrumentation code to restrict or anonymize the data that it gathers to respect user privacy.

The system 100 can analyze information received from the client devices 110 to identify alien content. Such information may include the reports of information collected by the instrumentation code 115 that executed on one or more of the client devices 110. In one example implementation depicted in FIG. 1B, the server subsystem 104 that serves a particular set of web servers 102 may receive and analyze the reported information. In this configuration, the server subsystem 104 may analyze a range of data from multiple client devices 110 and across multiple computing sessions that pertains to web pages or other resources provided by the particular set of web servers 102. Such configuration may be beneficial to an operator of a web site hosted on the particular web servers 102 to enable the operator to collect relevant data that pertains to only resources provided by that website. To facilitate analysis at the server subsystem 104, a cluster analyzer 126 and hyperplane module 106 may be included in the server subsystem. Techniques for implementing the cluster analyzer 126 and the hyperplane module 106 are discussed herein.

In one implementation of the system 100, as depicted in FIG. 1A, the central security system 105 analyzes information from the client devices 110 to identify alien content (which may be either malicious or benign, and may take the form of executable computer code or other content). The central security system 105 may be maintained by a third-party web security authority that monitors client devices 110 for alien content across multiple sites, servers, and/or domains. The central security system 105 may include modules that correspond to the cluster analyzer 126 and the hyperplane module 106 in the security subsystem 104 depicted in FIG. 1B. In addition, either or both of the central security system 105 and particular server subsystems 104 may receive and analyze instrumentation code reports or similar information, and either or both of such systems 104 and 105 may include the cluster analyzer 126 and the hyperplane module 106. In some implementations, one or more particular server subsystems 104 may forward information received from the instrumentation code 115 to the central security system 106. Whereas a particular server subsystem 104 can analyze data that pertains to a particular site or sites provided by particular web servers 102, the central security system 105 can aggregate large amounts of data from multiple sites, servers, and/or domains. Aggregation across multiple sites, servers, and/or domains allows the central security system 105 to identify and determine commonalities and/or variations in alien content and other abnormal behaviors between particular web pages, sites, servers, and server subsystems, for example. For instance, the central security server 105 may determine that some alien content is malicious because the alien content only interacts with resources from a particular website, which is more likely a characteristic of malware 116 than it is legitimate interactions.

The cluster analyzer 126, which can be installed in either or both of the server subsystem 104 and the central security system 105, or any other system or subsystem, can identify data clusters for information received from one or more of the client devices 110. The cluster analyzer 126 can use the identified data clusters to identify alien content on particular client devices 110 and to determine various other information as described herein.

In some implementations, the cluster analyzer 126 may use a hyperplane 106 to identify the data clusters. The hyperplane can have dimensions that correspond to aspects of the information received from the one or more client devices 110, including aspects of information from reports generated by instrumentation code 115. Instrumentation reports from a particular client device 110 may include information that characterizes the DOM, context data that indicates the circumstances and environment of the client's 110 execution of a page, and activity data that indicates particular actions that the instrumentation code 115 flagged. Some examples include, for information that characterizes the DOM, a hashed, compact representation of the DOM; context data may include the client's 110 IP address, browser information, and a site identifier; and activity data may be indications of user input or calls to particular functions or methods that interact with the DOM. Any such aspects of information can define the hyperplane's dimensions.

To identify alien content, the cluster analyzer 126 may plot representations of one or more aspects of information received from the client devices 110 in the hyperplane 106. The hyperplane 106 may be virtual, wherein the hyperplane 106 is defined by data in a database, an array, or other data structure. The hyperplane 106 may have nodes that correspond to particular client devices 110 or particular instances of information of the client devices 110. The hyperplane 106 depicted in FIG. 1B includes a node for each of the depicted client devices 110 (and other client devices 110 that are not explicitly depicted). Depending on the relevant dimensions of the hyperplane 106, the nodes may also represent any aspect of information received from the client devices 110.

For example, in FIG. 1B, the hyperplane 106 includes nodes for each of the depicted client devices 110A-F, some of which have been infected with malicious code (malware) 116, and others that have not. The malicious code 116C, 116D, and 116F at the infected client devices 110C, 110D, and 110F, respectively, may have interacted with the DOM and modified it to deceive a user into taking some action or to institute an unauthorized transaction. The cluster analyzer 126 can identify operations of the malware 116 by plotting data from the client devices 110 in the hyperplane 106. For instance, the hyperplane 106 may generate a plot using data for the compact representations of the DOM. The identity of a particular web page or site may define one dimension of the hyperplane 106 such that the nodes indicate representations of the DOM for the particular page or pages in the site from various instrumentation reports. The plot can include data from a large number of instrumentation reports such that hundreds or thousands of data points can be compared to identify alien content.

The cluster analyzer 126 can identify clusters in the hyperplane 106 that may indicate alien content. In FIG. 1B, the hyperplane 106 includes two clusters. A first, larger cluster toward the bottom, left of the hyperplane 106 includes most of the plotted data points, and has a relatively high density in a particular area of the hyperplane 106. This first cluster includes information from client devices 110A, 110B, and 110E, which have not been infected with malicious code 116. The first cluster may indicate, for example, that across multiple client devices 110, multiple sessions, multiple browsers, or across any other known parameter for the data, the representations of the DOM for the particular page were relatively similar. Since a high percentage of the nodes occur in the first cluster, the cluster analyzer 126 may determine that the first cluster indicates a normal or expected representation of the DOM for the particular page or site. Nodes that occur outside the first cluster may indicate abnormal behavior at the client devices 110 associated with such nodes that caused a change in the DOM such as malware 116 or a browser plug-in. For example, a smaller second cluster is depicted toward the top right of the hyperplane 106 in FIG. 1B. The second cluster includes data from the client devices 110C, 110D, and 110F, which each have some form of malicious code 116 in them (e.g., man-in-the-browser). The second cluster of data can indicate to the cluster analyzer 126 that there is likely some form of alien content on the client devices 110 associated with the data in such cluster that caused deviations from the normal structure of the DOM.

In some implementations, the dimensions of the hyperplane 106 can correspond to particular features of the web pages identified as being relevant to determining whether the actions are benign or malicious. For example, the cluster analyzer 126 may plot representations of the DOMs for a particular page or site from multiple client devices 110 and/or across multiple sessions in order to identify particular client devices 110 that likely have alien content. The cluster analyzer 126 can then analyze the hyperplane 106 in a different dimension, such as a dimension corresponding to a different page or website, and determine whether the previously identified client devices again deviate from a baseline cluster of representations of the DOM for the different page or website. If so, the cluster analyzer 126 may infer that the deviations are benign based on the assumption that most malware 116 activates only at particular targeted websites, whereas if the second cluster involving the identified client devices 110 occur only for a particular website, then the cluster analyzer 126 may infer that the alien content is malicious.

In some implementations, the system 100 may analyze one or more additional or other factors to identify alien content and/or to determine whether such content is benign or malicious. For instance, the cluster analyzer 126 may identify where multiple clusters or scattered nodes more likely correspond to varying, personal configurations of a page or site rather than an indication of alien content. The cluster analyzer 126 may also compare samples and clusters to other samples or clusters that are known to correspond to either benign or malicious content. Or it may identify a cluster as having nodes that are known to be benign or malicious, and then inferring that other nodes in such cluster are similarly benign or malicious.

Additionally, the cluster analyzer 126 may use information other than information that pertains to DOMs for analysis. For instance, large amounts of data from instrumentation code 115 may include information about how alien content attempted to interact with the DOM for a given page or pages on a website. The nodes can indicate occurrences of such interaction, and the cluster analyzer 126 can determine where and how clusters form across one or more dimensions of the hyperplane 106. The hyperplane 106 may include data, and/or be defined by dimensions, that correspond to various information reported from or about the client devices 110, including information about the DOM of an executing page, context data, and interaction (activity) data (e.g., defined user selections of objects on a web page). Moreover, the data may be sampled from one or more client computing devices 110, computing sessions, server subsystems 104, server subsystem 104 platform or software versions, web servers 102, web pages, web sites, domains, and/or any other relevant information. Identifying alien content may include identifying whether clusters correspond to features previously identified as being related to benign variations in client devices 110.

The results of the cluster analyzer's 126 analysis can be used to improve operation and security of the system 100. In some implementations, the web servers 102 or server subsystems 104 can use the results to determine a manner to respond where abnormal computer behavior is detected. If the cluster analyzer 126 indicates that abnormal behavior stems from alien content, the web server 102 may be configured to stop interacting with the client device 110 associated with the alien content or to otherwise alter how it processes requests from the client device 110. Particularly, the web servers 102 or server subsystems 104 may restrict their interactions with a client device 110 for which malicious alien code 116 has been detected. The cluster analyzer's 126 data can also be used to update the server subsystem 104 to allow interactions with benign alien content, and to deflect operations of malicious code 116. In some instances, information about clusters can be used by security monitors to identify particular client devices 110 to individually evaluate or inspect for alien content.

The system 100 may include a load balancer 120, which can function as a reverse proxy and distribute incoming traffic from client devices 110 among one or more web servers 102 and/or one or more server subsystems 104. The load balancer 120 can be connected to a network 108 such as the internet, one or more web servers 102, and one or more server subsystems 104. The load balancer 120 analyzes incoming traffic (e.g., traffic destined for the web servers 102) and may categorize the traffic into shards. Traffic may be distributed, for example, based on a Layer 4 transport or network layer analysis, or based on a Layer 7 application layer analysis. For example, FTP requests may be channeled to a web servers 102 configured to process FTP requests, whereas HTTP requests may be channeled to a web servers 102 configured to process HTTP requests.

Similarly, in Layer 7 analysis, the load balancer 120 may distribute incoming traffic based on the content of an HTTP header or content of the application message itself. For instance, at an online banking website for www.examplebank.com, certain pages on the site may be unrelated to a customer's online banking experience, such as privacy and terms of use pages for the site. At these pages, the customer does not interact with his bank account, and the customer can only consume or request information from the page, but he cannot post information to the web servers 102 from that page. These pages may be deemed a low security risk and the load balancer 120 can be configured to identify low risk pages from HTTP requests in incoming traffic. The load balancer 120 may forward low risk traffic directly to the web servers 102 and bypass the security subsystem 104. In other implementations, load balancer 120 may be configured to transmit even low-risk traffic from client devices 110 to the security subsystem 104 so that information about the traffic may also be recorded and analyzed, for example, by the cluster analyzer module 126 and/or the hyperplane module 106, as described herein.

The load balancer 120 can also distribute traffic among multiple server subsystems 104. In one example, incoming traffic can be distributed so that each security subsystem 104 maintains a substantially equal load as the other server subsystems 104 or receives a substantially equal amount of traffic as the other server subsystems 104. In some instances, incoming traffic may be responsive to previously transmitted web code that had been processed and modified by a particular security subsystem 104. The load balancer 120 may distribute such incoming traffic to the particular security subsystem 104 that generated the previously modified code so that the particular security subsystem 104 can apply a reverse modification to web code in the incoming traffic based on a transformation table that may be stored locally on the particular security subsystem 104. In some implementations, however, transformation tables may be shared or accessible by one or more other server subsystems 104, or modifications may be stateless, so that web code from incoming traffic can be distributed to any security subsystem 104.

Once incoming traffic has been distributed to and processed by a security subsystem 104, the load balancer 120 may receive the processed traffic from the security subsystem 104 and forward the traffic to the web servers 102.

The load balancer 120 can also distribute outgoing traffic from the web servers 102 for processing by a security subsystem 104 before transmitting the traffic to the client device 110. Similar to analyzing incoming traffic, the load balancer 120 may categorize outgoing traffic into shards based on information in the network, transport, or application layers of the traffic. The load balancer 120 may determine that some traffic shards may bypass the security subsystem 104 and may transported over the internet 108 for transmission to a client device 110. Other shards may be distributed to one or more server subsystems 104 for processing. In implementations of the system 100 that include multiple server subsystems 104, the load balancer 120 may distribute outgoing traffic to maintain generally equivalent loads among the multiple server subsystems 104. The server subsystems 104 can then transmit processed traffic back to the load balancer 120 for delivery to client devices 110 over the network 108.

In some implementations, the cluster analyzer 126 can form a hypothesis about the presence of alien code on particular client devices 110. The hypothesis may be determined by analyzing clusters of information that correspond to run-time data, network, and/or device information provided by a plurality of client devices 110. The clusters may be identified from particular instances of data provided by instrumentation code on one or more of the client devices 110, and/or across one or more computing sessions. To form the hypothesis, the cluster analyzer 126 analyzes the data in the hyperplane 106, identifies clusters from such data, and uses the clusters to determine a set of one or more parameters from the data that indicates a probability that alien content has interacted with a group of client devices 110. The set of parameters that form the hypothesis can be identified from particular dimensions in the hyperplane 106 that correspond to types of information received from the client devices 110, such as the run-time data, network, and/or device information. For example, parameters may be identified from dimensions in the hyperplane 106 in which the clusters were identified. Thus, if a parameter such as a particular browser type, DOM interaction, or other type of information described herein is set as a dimension in the hyperplane 106 from which a cluster is identified, the cluster analyzer 126 may form a hypothesis that the parameter is an indicator of alien content. In some implementations, the cluster analyzer 126 forms a hypothesis using data analysis and statistical techniques other than, or in addition to, hyperplane analysis. A hypothesis may also be provided by systems or modules external to the cluster analyzer 126. A system operator or other user may also formulate a hypothesis and provide it to the cluster analyzer 126. The cluster analyzer 126 may also generate a random hypothesis.

The cluster analyzer 126 includes a learning engine that tests and refines hypotheses. In some implementations, the learning engine communicates with the decode, analysis, and re-encode module 224 to cause the security subsystem 104 to adjust the manner in which web code provided by the servers 120 is modified prior to being transmitted to the client devices 110. The learning engine may also communicate with the instrumentation module 226. Using information received from the learning engine, the instrumentation module 226 may adjust the instrumentation code to collect additional data relating to a hypothesis. For example, the cluster analyzer 126 may determine an initial hypothesis that a particular pattern of DOM interactions is likely caused by alien content on the client devices 110. In response, the cluster analyzer 126 requests the instrumentation module 226 to generate instrumented web code that reports information from the client devices 110, and that can be used to test and further refine the hypothesis. For example, the instrumentation code may be configured to report information associated with the particular pattern of DOM interactions indicated above. The learning engine may direct the instrumentation module 226 to configure the instrumentation code to report detections of particular conditions related to the hypothesis, to increase the frequency with which the client devices 110 report such conditions, and/or to target a subset of client devices 110 for elevated scrutiny regarding the conditions related to the hypothesis.

Figure 2:
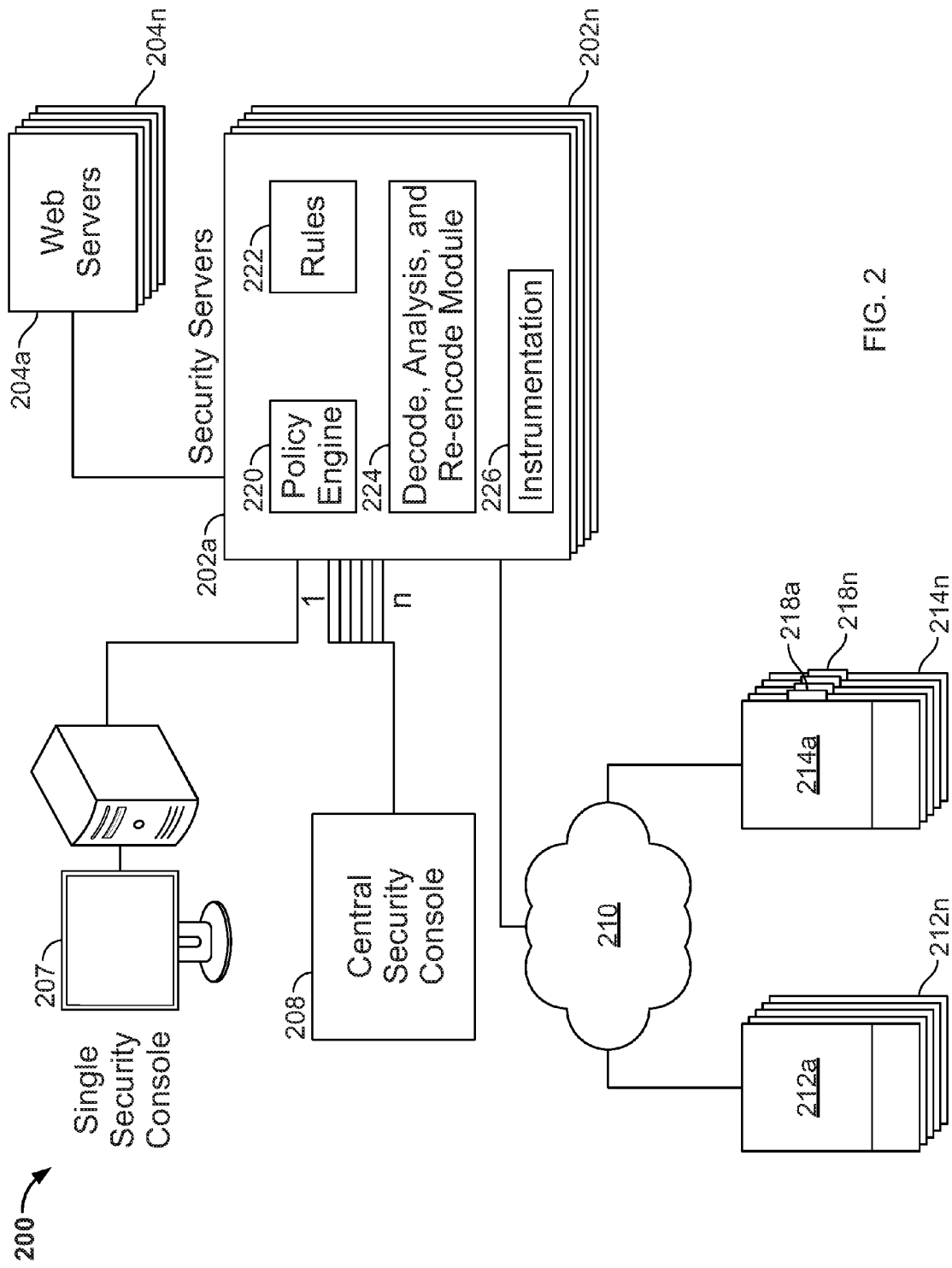
FIG. 2 is a schematic diagram of a system for performing deflection and detection of malicious activity with respect to a web server system.

FIG. 2 is a schematic diagram of a system 100 for performing deflection and detection of malicious activity with respect to a web server system. The system may be the same as or similar to the system 100 discussed with respect to FIGS. 1A and 1B, and is shown in this example to better explain the interrelationship of various general features of the overall system 200, including the use of instrumentation code for detection and deflection that is discussed in greater detail throughout this document.

The system 200 in this example is a system that is operated by or for a large number of different businesses that serve web pages and other content over the internet, such as banks and retailers that have respective on-line presences (e.g., on-line stores, or on-line account management tools). The main server systems operated by those organizations or their agents are designated as web servers 204a-204n, and could include a broad array of web servers, content servers, database servers, financial servers, load balancers, and other necessary components (either as physical or virtual servers).

A set of security server systems 202a to 202n are shown connected between the web servers 204a to 204n and a network 210 such as the internet. Although both extend to n in the figure, the actual number of sub-systems could vary. For example, certain of the customers could install two separate security server systems to serve all of their web server systems (which could be one or more web server systems), such as for redundancy purposes. The particular security server systems 202a-202n may be matched to particular ones of the web server systems 204a-204n, or they may be at separate sites, and all of the web servers for various different customers may be provided with services by a single common set of security servers 202a-202n (e.g., when all of the server systems are at a single co-location facility so that bandwidth issues are minimized).

Each of the security server systems 202a-202n may be arranged and programmed to carry out operations like those discussed above and below, and other operations. For example, a policy engine 220 in each such security server system 202 may evaluate HTTP requests from client computers (e.g., desktop, laptop, tablet, and smartphone computers as indicated by the client devices 110 described with reference to FIGS. 1A and 1B) based on header and network information, and can set and store session information related to a relevant policy. The policy engine 220 may be programmed to classify requests and to determine a security policy to apply for each request that indicates how the server subsystem 202 should process content provided by the web servers 204 in response to the requests. An indication of the determined security policy for each request may be stored as policy information on the security server systems 202, and the policies may indicate particular actions to be taken with respect to code returned by the web server systems 204 in response to the requests before such code is served back to a client computer. Upon receiving such code from the web server systems 204, the policy engine 220 may identify the appropriate security policy to apply with respect to such code. Information about the security policy may then be provided from the policy engine 220 to the decode, analysis, and re-encode module 224 in the security server systems 202.

The decode, analysis, and re-encode module 224 can modify content from the web servers 204 each time the content is served according to a determined security policy, and can be configured to modify multiple content types that may each be provided in response to a particular request. For example, HTML, JavaScript, and CSS content types may all be provided in response to a request for a single webpage. Using the policy information provided by policy engine 220, the decode, analysis, and re-encode module 224 matches the content to be delivered, across multiple content types, to actions to be taken on the content (e.g., using XPATH within a DOM), such as substitutions, addition of content, and other actions that may be provided as extensions to the system. For example, the different types of content may be analyzed to determine names that may extend across such different pieces of content (e.g., the name of a function or parameter), and such names may be changed in a way that differs each time the content is served, e.g., by replacing a named item with randomly-generated characters. Elements within the different types of content may first be grouped as having a common effect on the operation of the code, and then may be re-encoded together in a common manner so that their interoperation with each other will be consistent even after the re-encoding.

A rules engine 222 may store analytical rules for performing such analysis and for re-encoding of the content. The rules engine 222 may be populated with rules developed through operator observation of particular content types, such as by operators of a system studying typical web pages that call JavaScript content, and recognizing that a particular method is frequently used in a particular manner. Such observation may result in the rules engine 222 being programmed to identify the method and calls to the method so that they can all be grouped and re-encoded in a consistent and coordinated manner.

The decode, analysis, and re-encode module 224 encodes content being passed to client computers from a web server according to relevant policies and rules. The module 224 also reverse encodes requests from the client computers to the relevant web server. For example, a web page may be served with a particular parameter, and may refer to JavaScript that references that same parameter. The decode, analysis, and re-encode module 224 may replace the name of that parameter, in each of the different types of content, with a randomly generated name, and each time the web page is served, the generated name may be different. When the name of the parameter is passed back to the web server, it may be re-encoded back to its original name so that this portion of the security process may occur seamlessly for the web server.

An encryption key for the function that encodes and decodes such strings can be maintained by the security server system 202 along with an identifier for the particular client computer so that the system 202 may know which key or function to apply, and may otherwise maintain a state for the client computer and its session. A stateless approach may also be employed, whereby the security server system 202 encrypts the state and stores it in a cookie that is saved at the relevant client computer. The client computer may then pass that cookie data back when it passes the information that needs to be decoded back to its original status. With the cookie data, the system 202 may use a private key to decrypt the state information and use that state information in real-time to decode the information from the client computer. Such a stateless implementation may create benefits such as less management overhead for the server system 202 (e.g., for tracking state, for storing state, and for performing clean-up of stored state information as sessions time out or otherwise end) and as a result, higher overall throughput.

An instrumentation module 226 is programmed to add active code to the content that is served from a web server. The instrumentation code is code that is programmed to monitor the operation of other code that is served. For example, the instrumentation code may be programmed to identify when certain methods are called, when those methods have been identified as likely to be called by malicious software. When such actions are observed by the instrumentation code to occur, the instrumentation code may be programmed to send a communication to the security server reporting on the type of action that occurred and other meta data that is helpful in characterizing the activity. Such information can be used to help determine whether the action was malicious or benign.

The instrumentation code may also analyze the DOM on a client computer in predetermined manners that are likely to identify the presence of and operation of malicious software, and to report to the security servers 202 or a related system. For example, the instrumentation code may be programmed to characterize a portion of the DOM when a user takes a particular action, such as clicking on a particular on-page button, so as to identify a change in the DOM before and after the click (where the click is expected to cause a particular change to the DOM if there is benign code operating with respect to the click, as opposed to malicious code operating with respect to the click). Data that characterizes the DOM may also be hashed, either at the client computer or the server system 202, to produce a representation of the DOM that is easy to compare against corresponding representations of DOMs from other client computers. Other techniques may also be used by the instrumentation code to generate a compact representation of the DOM or other structure expected to be affected by malicious code in an identifiable manner.

As noted, the content from web servers 204a-204n, as encoded by the decode, analysis, and re-encode module 224, may be rendered on web browsers of various client computers. Uninfected clients computers 212a-212n represent computers that do not have malicious code programmed to interfere with a particular site a user visits or to otherwise perform malicious activity. Infected clients computers 214a-214n represent computers that do have malicious code (218a-218n, respectively) programmed to interfere with a particular site a user visits or to otherwise perform malicious activity. In certain implementations, the client computers 212, 214 may also store the encrypted cookies discussed above and pass such cookies back through the network 210. The client computers 212, 214 will, once they obtain the served content, generate the DOM for managing the displayed web pages, and instrumentation code may monitor the DOM as discussed above. Reports of abnormal activity (e.g., software on the client device calling a method that does not exist in the downloaded and rendered content) may also be reported and logged.

The reports from the instrumentation code may be analyzed and processed in various manners in order to determine how to respond to particular abnormal events, and to track down malicious code via analysis of multiple interactions. For small-scale analysis, each web site operator may be provided with a single security console 207 that provides analytical tools for a single site or group of sites. For example, the console 207 may include software for showing groups of abnormal activities, or reports that indicate the type of code served by the web site that generates the most abnormal activity. For example, a security officer for a bank may determine that defensive actions are needed if most of the reported abnormal activity for its web site relates to content elements corresponding to money transfer operations—an indication that stale malicious code (i.e., code written under an assumption that the bank is not changing the code between different times that a web page is served) may be trying to access such elements surreptitiously.

A central security console may connect to a large number of web content providers, and may be run, for example, by an organization that provides the software for operating the security server systems 202a-202n. Such console 208 may access complex analytical and data analysis tools, such as tools that identify clustering of abnormal activities across thousands of client computers and sessions, so that an operator of the console 208 can focus on those clusters in order to diagnose them as malicious or benign, and then take steps to thwart any malicious activity.

In certain other implementations, the console 208 may have access to software for analyzing telemetry data received from a very large number of client computers that execute instrumentation code provided by the system 200. Such data may result from forms being re-written across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like. Such collected telemetry data, across many thousands of sessions, may be used by the console 208 to identify what is "natural" interaction with a particular page and what is "unnatural" interaction that is likely the result of a bot interacting with the content. Statistical and machine learning methods may be used to identify patterns in such telemetry data, and to resolve bot candidates as being present on particular client computers. Such client computers may then be handled in special manners by the system 200, may be blocked from interaction, or may have their operators notified that their computer is running bad software.

Figure 3:
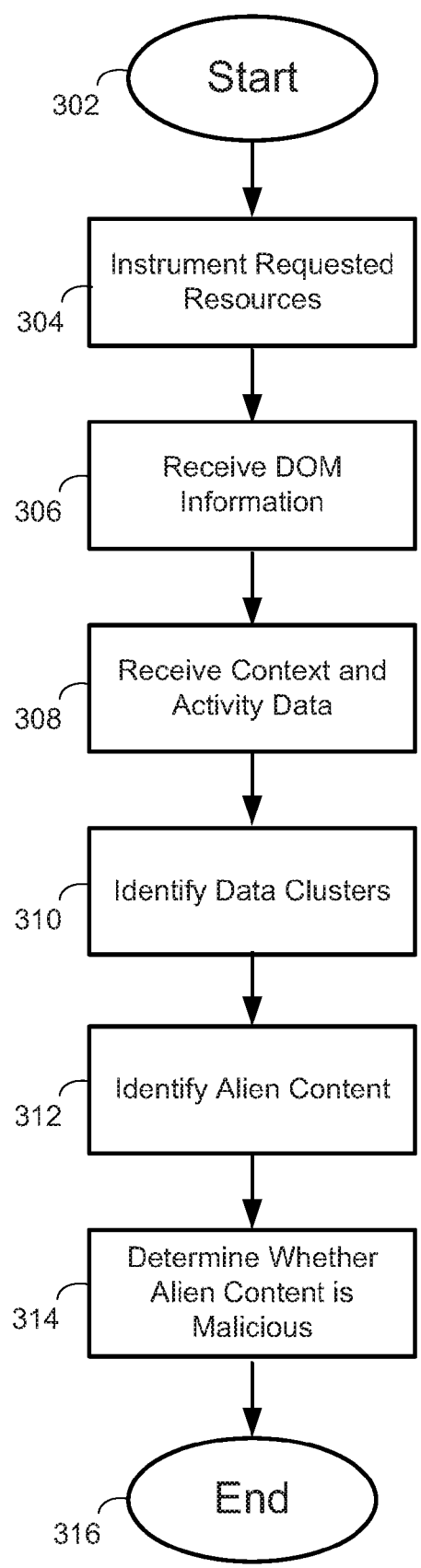
FIG. 3 is a flow chart of an example process for serving instrumented code and monitoring client devices to identify alien content.

FIG. 3 is a flow chart of an example process for serving instrumented code and monitoring client devices to identify alien content. The operations in the flow chart depicted in FIG. 3 can be performed in some implementations by system 100 and/or system 200 as described herein for greater clarity, or may be implemented by other systems.

At 304, the process begins by instrumenting an electronic resource requested by one or more client devices 110 with code that can collect information about the execution of the resource at the client device 110. Such instrumentation code 115 may execute in coordination with the electronic resource and can generate reports about information that it has collected to send to a security system for analysis. In some implementations, the security system may be an intermediary system such as the security subsystem 104 in system 100 that may process, modify, instrument, and/or analyze traffic between a set of web servers 102 and client devices 110. In other implementations, the security system that receives and analyzes reports from instrumentation code 115 may be a central security system 105 that can collect reports from code that was instrumented by multiple security subsystems 104 that may each serve different sets of web servers 102. Instrumentation reports from the instrumentation code 115 may be generated and reported periodically during execution of the resource on the client device 115, upon request, upon detection of one or more defined events, and/or in coordination with user interaction with the resource, for example. The resource may be any content provided to a client device 110 upon request, including a web page.

The instrumentation code 115 can be supplemented to web code for a resource and configured to collect information or detect anomalous activity according to any of the techniques described herein. For example, the instrumentation code 115 may generate compact representations of the DOM for a web page or otherwise determine information about the DOM that can be used for identifying alien content that may have infected a client device 110. The instrumentation code 115 may "walk"/traverse the DOM, or a portion of the DOM, and perform reduction processes to generate strings or other data structures that are substantially smaller than the actual size of the DOM but that characterize its content. For instance, the reduction processes may include a hash function that is performed on relevant portions of the DOM. Representations of differences in the DOM that occur over time while a web page executes or before and after an event such as a user selection occurs can also be collected and reported by the instrumentation code 115. In some implementations, the instrumentation code 115 may be configured to intelligently collect information about particularly relevant portions of the DOM. For instance, information that the instrumentation code 115 collects and reports about the DOM may be compared to other representations of the DOM on other devices or in other sessions. Some differences may result from personal configurations that a user has made for the web page and personalized content associated with the user or his device that is provided from a web server 102. The instrumentation code 115 may identify the non-personalized portions of the DOM for which to generate a representation of so that more effective comparisons can be made between different users, devices, and sessions without regard to personalization.

The requested resource can also be instrumented with code that detects and reports particular activity at the client device 110. The instrumentation code 115 may, for example, identify user interaction with a web page such as key strokes, mouse movements, changes in focus between particular forms, fields, or frames, and the patterns and timing of interactions with the page. Other activity or interaction data may be collected, such as where the client device 110 calls particular JavaScript actions and methods that commonly interact with the DOM (e.g., "document.write," "getElementById," "getElementByName," XPath commands, and setting of HTML elements in the DOM to particular values). The instrumented code 115 can also collect and report context information that indicates the circumstances and environment in which the resource was executed by the client 110, such as the IP and MAC addresses of the client device, an identity of the executing resource and the web domain or servers 102 from which the resource originated. The instrumented code 115 may also identify and report changes that occur to the DOM upon the occurrence of events relating to a web page corresponding to the DOM, such as information that indicates what happens to the DOM when a user selects certain objects.

At 306, the security system receives data from the client devices 110 that characterizes subsets of particular DOMS for web pages that executed on the client devices 110. The data that characterizes subsets of the particular DOMS can include compact representations of the DOM that were generated by the instrumented code 115 that the security system provided to the client devices 110 in association with a requested resource, or any other information collected by the instrumented code 115.

In certain implementations of the process depicted in FIG. 3, the security system may receive large amounts of data that include many data points about information that characterizes the DOM and/or other information related to the execution of a resource at one or more client devices 110. The process may include receiving and aggregating information from many client devices 110, for many different resources, and/or across many computing sessions. For example, a web page for an online merchant may be requested by tens of thousands of users each day. The web page can be instrumented, at 304, with code to collect information about the execution of the page on each client device that requested the page. At 306, the security system can receive reports from the instrumentation code 115 on each of these pages, and use the information to analyze abnormal computing behavior and to identify alien content by comparing information from each of the pages according to various factors. In other examples, multiple different sites may each serve different web pages to client devices 110 upon the client's 110 request. Each page can be supplemented with instrumentation code 115, and provided to the security system so that further analysis can be done across sites and for particular client devices 110, for instance.

At 308, the security system may receive context data and activity data from instrumentation code 115 on the client devices 110. Such information can be received in addition to or alternatively to information that characterizes the DOM for a web page, and can be useful in identifying anomalous behaviors and alien content. Just as large amounts and numbers of data points from various clients 110, sites, and sessions may be received relating to data that characterizes the DOM, the security system may receive context data and activity data in similar manners.

At 310, the process identifies data clusters among the large amounts of data that has been received regarding the DOM, context, and activity information of web pages that executed on particular client devices 110. Identifying clusters can be accomplished using any of the techniques described herein, such as those respect to FIG. 1. For example, data that characterizes information about the DOM of particular web pages across multiple page loads at various client devices 110 can be plotted in a hyperplane 106. The security system may plot and analyze the hyperplane 106 to identify data clusters. Nodes that each have particular locations in the hyperplane 106 may each represent an instance of data for one representation of a DOM. Absolute and relative locations of the nodes in the hyperplane 106 can indicate clusters, which may be identified based on, for example, a density of nodes in a given area of the hyperplane 106.

At 312, the process identifies alien content using the identified clusters. Alien content may include any content corresponding to a particular web page at a client device that is not the result of content that was served to execute the page. For example, a web server 102 may provide HTML, JavaScript, and CSS files to a client device 110, which a browser at the client 110 can use to build a DOM for the web page and display the page to a user who may interact with the web page. If a browser plug-in (benign) or a man-in-the-browser (malicious) surreptitiously interacts with the DOM in a way that would not be expected given the provided HTML, JavaScript, and CSS that were delivered for the web page, such interaction can constitute abnormal or anomalous computing behavior resulting from alien content.

The process may identify alien content from clusters in some instances by determining that certain nodes in the hyperplane 106 fall outside a primary cluster. The primary cluster may indicate a normal or expected representation of the DOM on a substantial portion of client devices 110 that are assumed to not have alien content. Additionally, some nodes may represent instances where it has previously been determined that alien content has not interacted or does not interact with a given web page, and the cluster(s) of which such nodes are among can be deemed primary or benign clusters. Nodes that are located beyond a particular distance in the hyperplane 106 from one or more primary clusters may indicate that alien content has interacted with or modified the DOM for such nodes.

Generally, alien content at client devices 110 can be identified using information gathered by instrumentation code at the client devices 110. Many data samples can be analyzed to develop a 'norm,' which may be indicated by a cluster of a large number or portion of the analyzed samples in the hyperplane 106. Other clusters that deviate from the norm can indicate the presence of alien content on the client device. For instance, if all samples for a particular requested resource were identical across many visitors, the system 100 may determine that alien code had interacted with such resource. Other clusters that deviate from the 'norm' (i.e., primary cluster) may indicate alien code for abnormal actions or unexplained content, for example. Some alien content may cause deviations, but are authorized, legitimate, and/or benign, such as a user-installed browser plug-in. Other alien content may be malicious such as malware 116.

In some implementations, the hyperplane 106 may be defined by dimensions that correspond to particular features of the web pages that have been identified as being relevant to determining whether the actions are benign or malicious. For example, the hyperplane 106 may have dimensions that correspond to objects that a user selects on the web page. Dimensions may also include, for example, information from context data or interaction data associated with executing the web page, such as an identifier of an application (e.g., the type of web browser) that rendered the web page, and an identifier of the site or domain that provided the web page (e.g., www.examplesite.com). The security system may also identify clusters from dimensions of the context or activity data. For instance, some clusters may occur based on alien content that only interacts with particular web sites or that only resides in particular web browsers. The security system may generate a hyperplane 106 having dimensions defined by web site identity or web browser identity, for instance, to identify alien content from clusters associated with particular sites or browsers. The hyperplane 106 may also be configured to only populate nodes that have one or more particular features, such as data from particular client devices 110 or data that relate to content from particular web sites.

The security system in the process may also use web page features to identify whether clusters in the hyperplane 106 correspond to features that were previously identified as being related to benign variations in client devices 110. For example, some clusters in a hyperplane 106 may correspond to changes in the DOM that enable a toolbar to appear in a client, or for a browser plug-in to annotate certain words in a page with their dictionary definitions. Such clusters indicate alien content, but are known to correspond to benign software. Other clusters in the hyperplane 106 may correspond to changes in the DOM that have previously been identified as malicious.

At 314, the security system determines whether identified alien content is benign or malicious. For instance, the identified alien content may be compared to other content that has previously been determined to be either benign or malicious. The previous identification can be made, for instance, by analyzing a signature of particular alien content and/or through analysis by a system operator.

Figure 4:
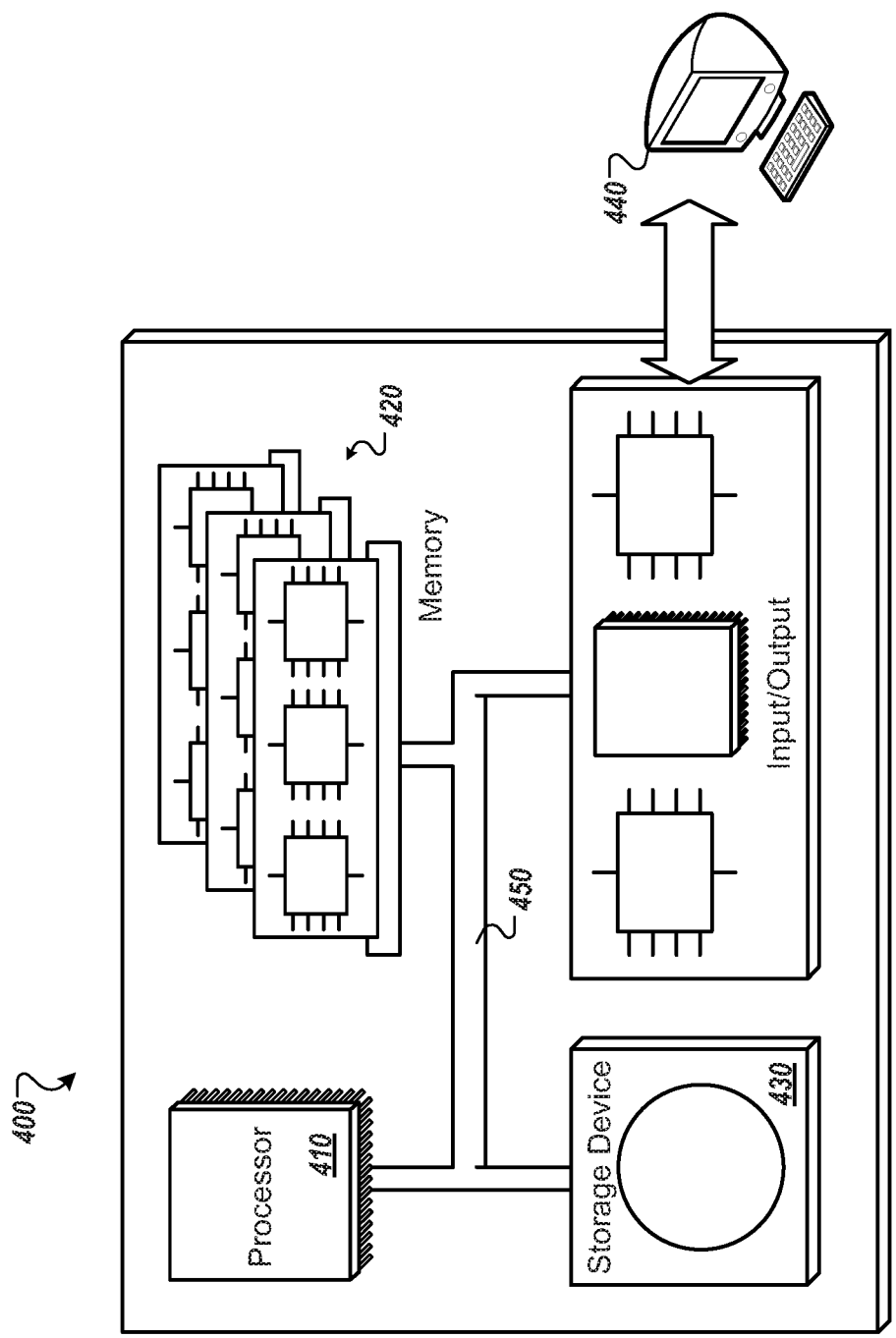
FIG. 4 is a block diagram of an example computer that may be used in implementing the systems and processes described in this document.

FIG. 4 is a schematic diagram of a computer system 400. The system 400 can be used for the operations described in association with any of the computer-implement methods described previously, according to one implementation. The system 400 is intended to include various forms of digital computers, such as laptops, desktops, workstations, personal digital assistants, servers, blade servers, mainframes, and other appropriate computers. The system 400 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or that includes applications that run on mobile devices such as smartphones and tablets, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. In some implementations, the subject matter may be embodied as methods, systems, devices, and/or as an article or computer program product. The article or computer program product may comprise one or more computer-readable media or computer-readable storage devices, which may be tangible and non-transitory, that include instructions that may be executable by one or more machines such as computer processors.

What is claimed is:

1. A computer-implemented method for identifying abnormal computer behavior, the method comprising:
receiving, at a computer server subsystem, data that characterizes subsets of document object models for web pages rendered by client computers;
identifying clusters from the data that characterize the subsets of the document object models; and
using the clusters to identify alien content on the client computers by determining that the alien content comprises content in the document object models that is not a result of content that is the basis of a particular document object model defined in a first set of code served to a particular client computer of the client computers.

2. The computer-implemented method of claim 1, wherein the data that characterizes subsets of the document object models is generated by a second set of code that is provided by the computer server subsystem and to the client computers in coordination with the web pages.

3. The computer-implemented method of claim 2, wherein the second set of code that is provided by the computer server subsystem identifies changes to the particular document object model in response to occurrence of events relating to the web pages.

4. The computer-implemented method of claim 3, wherein the events comprise defined user selections of an object on the web pages.

5. The computer-implemented method of claim 2, wherein the second set of code provided by the computer server subsystem performs reduction processes to generate strings that are smaller than the first set of code that defines the particular document object model and that characterize content of the document object models.

6. The computer-implemented method of claim 5, wherein the reduction processes comprise a hash function that is performed on at least portions of the document object models.

7. The computer-implemented method of claim 1, wherein the clusters are identified by plotting data from particular ones of the client computers on a hyperplane.

8. The computer-implemented method of claim 7, wherein the hyperplane is defined by dimensions that correspond to particular features of the web pages identified as being relevant to determining whether one or more actions are benign or malicious.

9. The computer-implemented method of claim 1, wherein using the cluster to identify alien content comprises identifying whether the clusters correspond to features previously identified as being related to benign variations in client computers.

10. The computer-implemented method of claim 1, further comprising sending, by the computer server subsystem and to a security server system, at least a portion of the data that characterizes subsets of document object models, wherein the security server system is configured to receive data from a plurality of computer server subsystems, and wherein particular ones of the plurality of computer server subsystems serve different web domains.

11. The computer-implemented method of claim 1, further comprising receiving, at the computer server subsystem, data that indicates context of at least one of (i) the web pages and (ii) the client computers.

12. The computer-implemented method of claim 11, wherein the data that indicates context comprises information that identifies the client computers.

13. The computer-implemented method of claim 11, wherein the data that indicates context comprises information that identifies an application that rendered one or more particular web pages of the web pages at particular ones of the client computers.

14. The computer-implemented method of claim 11, wherein the data that indicates context comprises information that identifies a web site or a web domain for which particular ones of the web pages were served.

15. The computer-implemented method of claim 11, wherein identifying clusters from the data that characterizes the subsets of the document object models comprises using the data that indicates context.

16. The computer-implemented method of claim 7, wherein the hyperplane is defined by dimensions that include at least one identifier of the particular ones of the client computers, an identifier of an application that rendered a particular web page of the web pages at particular ones of the client computers, and an identifier of a web site or a web domain that served particular ones of the web pages.

17. The computer-implemented method of claim 1, wherein the clusters are identified based at least in part on identities of particular ones of the web pages or on one or more identities of web domains that served particular ones of the web pages.

18. The computer-implemented method of claim 1, further comprising determining whether the identified alien content is benign or malicious.

19. The computer-implemented method of claim 18, wherein determining whether the identified alien content is benign or malicious comprises comparing the identified alien content to other alien content that has previously been identified as benign or malicious.

20. A computer system for identifying abnormal computer behavior comprising:
one or more processors;
a memory coupled to the one or more processors and storing one or more instructions, which when executed by the one or more hardware processors cause the one or more hardware processors to:
supplement web code with instrumentation code that is executable on a client device and that can collect information about execution of the web code at the client device, wherein the information includes representations of a document object model of the web code;
analyze information received from a plurality of client devices that was collected by instrumentation code on each of the plurality of client devices to identify alien content on the client devices.

* * * * *

UNITED STATES PATENT AND TRADEMARK OFFICE
CERTIFICATE OF CORRECTION

PATENT NO. : 9,609,006 B2
APPLICATION NO. : 14/980409
DATED : March 28, 2017
INVENTOR(S) : Justin D. Call et al.

It is certified that error appears in the above-identified patent and that said Letters Patent is hereby corrected as shown below:

On the Title Page

Inventors, replace "Xiaochan" with "Xiaohan"

Signed and Sealed this
Fifth Day of February, 2019

Andrei Iancu
*Director of the United States Patent and Trademark Office*